(12) United States Patent  
Zhao et al.

(10) Patent No.: US 11,323,293 B2  
(45) Date of Patent: *May 3, 2022

(54) WIRELESS COMMUNICATION METHOD AND WIRELESS COMMUNICATION DEVICE

(71) Applicant: Sony Group Corporation, Tokyo (JP)

(72) Inventors: Peiyao Zhao, Beijing (CN); Zhaocheng Wang, Beijing (CN); Jinhui Chen, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,318

(22) Filed: Jun. 2, 2021

(65) Prior Publication Data

US 2021/0288841 A1 Sep. 16, 2021

Related U.S. Application Data

(63) Continuation of application No. 16/822,034, filed on Mar. 18, 2020, now Pat. No. 11,057,245, which is a
(Continued)

(30) Foreign Application Priority Data

Feb. 5, 2016 (CN) .......................... 201610081338.3

(51) Int. Cl.
*H04L 23/02* (2006.01)
*H04L 25/02* (2006.01)
(Continued)

(52) U.S. Cl.
CPC ....... *H04L 25/0204* (2013.01); *H04B 7/0478* (2013.01); *H04B 7/0482* (2013.01);
(Continued)

(58) Field of Classification Search
CPC ... H04L 1/0054; H04L 1/005; H04L 27/2602; H04L 5/00; H04L 25/0224; H04L 5/0007;
(Continued)

(56) References Cited

U.S. PATENT DOCUMENTS

2012/0230380 A1 9/2012 Keusgen et al.
2013/0301464 A1 11/2013 Seol et al.
(Continued)

FOREIGN PATENT DOCUMENTS

CN 101682380 A 3/2010
CN 102158263 A 8/2011
(Continued)

OTHER PUBLICATIONS

Yantao Han. The potential approaches to achieve channel reciprocity in FDD system with frequency correction algorithms, 2010 5th International ICST Conference on Communications and Networking in China, Aug. 25, 2010.
(Continued)

*Primary Examiner* — Khai Tran
(74) *Attorney, Agent, or Firm* — Xsensus LLP

(57) ABSTRACT

A wireless communication method and a wireless communication device. An electronic device for a user equipment in a wireless communication system, including a processing circuit configured to receive, from a base station, channel state information reference signal with a set of reception filters, perform channel estimation on a downlink channel from the base station to the user equipment, select, from the set of reception filters, one or more particular reception filters corresponding to respective channel estimation results that satisfy a first predetermined condition, and signal, from the user equipment to the base station, sounding reference signal with one or more particular transmission filters, wherein the one or more particular transmission filters and
(Continued)

one or more particular reception filters are reciprocal respectively.

17 Claims, 11 Drawing Sheets

Related U.S. Application Data continuation of application No. 16/075,509, filed as application No. PCT/CN2017/071252 on Jan. 16, 2017, now Pat. No. 10,637,688.

(51) Int. Cl.

| | | |
|---|---|---|
| *H04B 17/00* | (2015.01) | |
| *H04B 7/06* | (2006.01) | |
| *H04B 7/0456* | (2017.01) | |
| *H04B 7/08* | (2006.01) | |
| *H04B 17/382* | (2015.01) | |
| *H04L 5/00* | (2006.01) | |
| *H04L 5/14* | (2006.01) | |
| *H04W 72/08* | (2009.01) | |

(52) U.S. Cl.
CPC ......... *H04B 7/0617* (2013.01); *H04B 7/0695* (2013.01); *H04B 7/088* (2013.01); *H04B 17/00* (2013.01); *H04B 17/382* (2015.01); *H04L 5/0048* (2013.01); *H04L 5/14* (2013.01); *H04W 72/085* (2013.01)

(58) Field of Classification Search
CPC .... H04B 7/0695; H04B 7/088; H04B 7/0408; H04B 7/0417; H04B 7/0456; H04B 7/0632; H04B 7/0626; H04W 72/046; H04W 72/042; H04W 72/1289

USPC .................................................. 375/262, 260
See application file for complete search history.

(56) References Cited

U.S. PATENT DOCUMENTS

| | | |
|---|---|---|
| 2014/0334564 A1 | 11/2014 | Singh et al. |
| 2015/0124688 A1 | 5/2015 | Xu et al. |
| 2018/0198511 A1 | 7/2018 | Maamari et al. |
| 2018/0219606 A1* | 8/2018 | Ng ........................ H04L 5/0053 |
| 2018/0323839 A1 | 11/2018 | Petersson et al. |
| 2019/0173564 A1 | 6/2019 | Li et al. |
| 2019/0222276 A1 | 7/2019 | Navarro Manchon et al. |
| 2020/0044719 A1 | 2/2020 | Zhu et al. |
| 2020/0091974 A1 | 3/2020 | Zhao et al. |
| 2020/0112355 A1* | 4/2020 | Park ..................... H04B 7/0626 |
| 2020/0395990 A1* | 12/2020 | Nam .................... H04B 7/0626 |

FOREIGN PATENT DOCUMENTS

| | | |
|---|---|---|
| CN | 104303477 A | 1/2015 |
| CN | 104506281 A | 4/2015 |
| CN | 104579586 A | 4/2015 |
| CN | 104604151 A | 5/2015 |
| CN | 104737464 A | 6/2015 |
| CN | 105009492 A | 10/2015 |
| JP | 2015-512580 A | 4/2015 |
| WO | WO-2013167018 A1 | 11/2013 |
| WO | WO-2015039294 A1 | 3/2015 |

OTHER PUBLICATIONS

International Search Report and Written Opinion for PCT/CN2017/071252 dated Apr. 5, 2017.
Notice of Reasons for Refusal, Japanese Application No. 2018-540457, dated Mar. 30, 2021; 12 pages, English translation.

\* cited by examiner

WIRELESS COMMUNICATION METHOD AND WIRELESS COMMUNICATION DEVICE

CROSS-REFERENCE TO RELATED APPLICATIONS

The present application is a continuation of U.S. application Ser. No. 16/822,034, filed Mar. 18, 2020, which is a continuation of U.S. application Ser. No. 16/075,509, filed Aug. 3, 2018, now U.S. Pat. No. 10,637,688, which is based on PCT filing PCT/CN2017/071252, filed Jan. 16, 2017, which claims priority to CN 201610081338.3, filed Feb. 5, 2016, the entire contents of each of which are incorporated herein by reference.

TECHNICAL FIELD

The present application relates to a wireless communication method and a wireless communication device, and more particularly to a wireless communication method and a wireless communication device for frequency division duplex (FDD) millimeter wave communication.

BACKGROUND

Recently, Millimeter Wave technology and Massive Multi-Input Multi-Output (MIMO) technology have been considered to be a part of the critical technology of 5G in the future, and have attracted wide attention from academia and industry. The frequency band of millimeter wave has a large amount of available spectrum resources and can meet the increasing traffic demand of mobile communications. In addition, due to the short wavelengths of millimeter waves, according to antennatheories, the antenna size of millimeter wave systems may also be small, so that it is possible to place hundreds of or even thousands of antennas in a small space, which is more advantageous for the application of large-scale antenna technology in real systems. Further, a beamforming technology provided by large-scale antennas can effectively compensate for the shortcomings of large path fading of millimeter wave channels, and provides the possibility for applying millimeter-wave technology to mobile communications.

SUMMARY

The inventors of the present application have found that in the existing to millimeter wave communication technology as mentioned above, it is necessary to determine corresponding beamforming parameters for each user to perform transmission. However, in a case where both the user equipment and the base station are configured with multiple antennas, the overhead of beam training becomes larger and larger as the number of antennas and the number of users increase. In addition, in a FDD communication system, beam training needs to be performed for uplink channels and downlink channels separately, and the overhead of this kind of training is twice that of a TDD communication system. Currently, there is no feasible solution to solve these problems.

Therefore, the present application proposes a new technical solution addressing at least one of the above-mentioned problems.

It is one of objects of the present application to provide a technical solution for wireless communication.

According to a first aspect of this invention, there is provided an electronic device for a first communication device in a wireless communication system, comprising: a storage device configured to store an analog codebook for the first communication device, the analog codebook comprising a plurality of sets of first configuration parameters fora set of phase shifters of the first communication device; and a processing circuit configured to: perform channel estimation on a first channel from a second communication device to the first communication device respectively based on the plurality of sets of first configuration parameters and signal transmission from the second communication device, select a set of first configuration parameters corresponding to ones of channel estimation results that satisfy a first predetermined condition to generate a reduced analog sub-codebook, configure signal transmission from the first communication device to the second communication device based on the analog sub-codebook, to perform channel estimation on a second channel from the first communication device to the second communication device.

According to a second aspect of this invention, there is provide a beam training method for frequency division duplex (FDD) millimeter wave communication, comprising: sending, by a user equipment, an uplink training sequence to a base station according to a user terminal codebook; receiving, by the base station, the uplink training sequence and calculating channel qualities under multiple combinations between weight vectors in the user terminal codebook and weight vectors in a base station terminal codebook; selecting a corresponding channel quality for each weight vector in the base station terminal codebook according to the channel qualities to form a first channel quality set; selecting a corresponding channel quality for each weight vector in the user terminal codebook according to the channel qualities to form a second channel quality set; selecting a first predetermined number of channel qualities from the first channel quality set and generating a reduced base station terminal codebook based on the weight vectors corresponding to the first predetermined number of channel qualities; selecting a second predetermined number of channel qualities from the second channel quality set and generating a reduced user equipment terminal codebook based on the weight vectors corresponding to the second predetermined number of channel qualities; and performing downlink beam training using the reduced base station terminal codebook and the reduced user equipment terminal codebook.

One of advantages of the present disclosure is that the overhead of beam training can be reduced.

In addition, according to some embodiments of the present application, it is also possible to increase the average achievable rate of users, thereby improving the performance of the FDD system.

According to some embodiments of the present application, it is also possible to further reduce the signaling overhead while maintaining low overhead of beam training.

Other features and advantages of the present invention will become apparent from the following detailed description of exemplary embodiments of the present invention with reference to the accompanying drawings.

BRIEF DESCRIPTION OF THE DRAWINGS

The accompanying drawings, which constitute a part of this specification, illustrate embodiments of the application and, together with the description, serve to explain the principles of the present disclosure.

The present disclosure can be more clearly understood from the following detailed description with reference to the accompanying drawings, in which.

DETAILED DESCRIPTION

Figure 1:
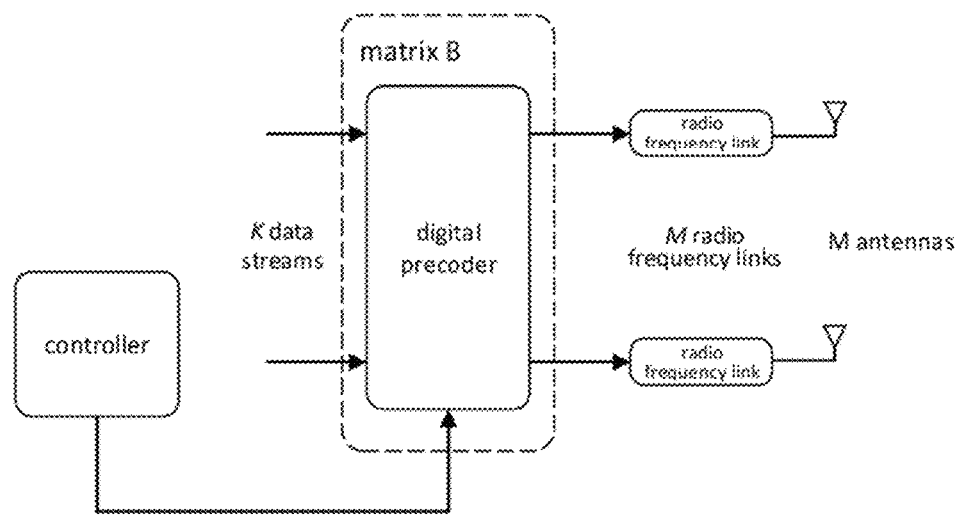
FIG. 1 is a view showing a structure of a base station of the prior art.

Various exemplary embodiments of the present invention will now be described in detail with reference to the accompanying drawings. Notice that, unless otherwise specified, the relative arrangement, numerical expressions and numerical values of the components and steps set forth in these embodiments do not limit the scope of the invention.

At the same time, it should be understood that, for ease of description, the dimensions of the various parts shown in the drawings are not drawn to actual proportional relations.

The following description of at least one exemplary embodiment is merely illustrative in fact and is in no way to be intended as any limitation to the present invention and applications or uses thereof.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

It should be notice that similar reference numerals and letters indicate the like in the following accompanying drawings, and therefore, once an item is defined in an accompanying drawing, there is no need for further discussion for it in the subsequent accompanying drawings.

In current wireless communication systems, a digital precoding architecture is mainly adopted, in which each antenna is connected to a radio frequency link, and the amplitude values of signals transmitted on each radio frequency link is adjustable to reduce the interference between multiple-channel data signals carried on the same transmission resource. For example, FIG. 1 shows the structure of a base station of the prior art. As shown in the drawing, under the digital precoding architecture, the base station terminal is equipped with M antennas (M is an integer and M≥1), and each antenna is arranged with a corresponding radio frequency link. A digital precoder obtains K data streams (K is an integer and K≥1) under the control of a controller, and performs digital precoding on the K data streams (for example, the K data streams are made to flow through a digital precoding matrix with a size of M×K). The coded data is sent to one or more users via radio frequency links and antennas.

Correspondingly, the user terminal may be configured in various ways.

Figure 2:
FIG. 2 is a view showing a user terminal configured with a single antenna.

FIG. 2 shows a user terminal configured with a single antenna. As shown in FIG. 2, the user terminal is provided with a single antenna and a corresponding single radio frequency link. Because the user terminal has only one antenna, it can only receive a single data stream. In other words, in K data streams sent from the M antennas of the base station, only one data stream can be received by the user terminal.

Figure 3:
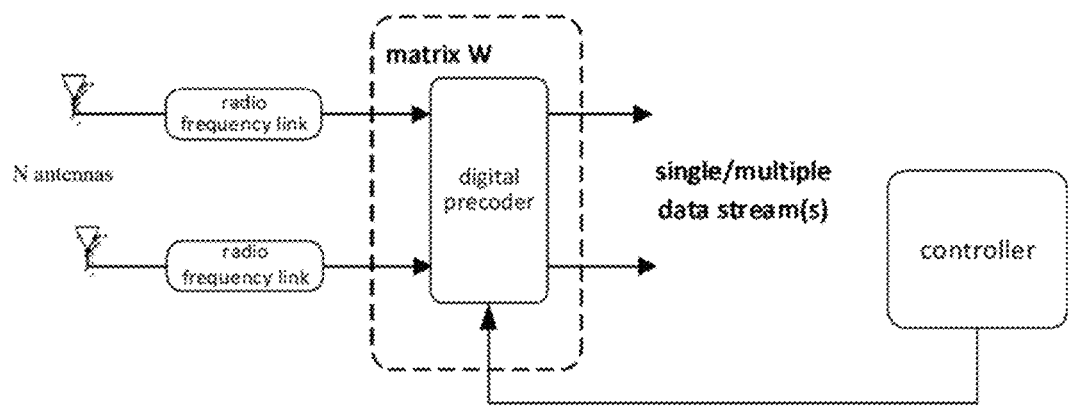
FIG. 3 is a view showing a user terminal configured with multiple antennas.

FIG. 3 shows a user terminal provided with multiple antennas. As shown in FIG. 3, the user terminal is configured with N antennas (N is an integer and N>1). Each antenna transmits the received data to a digital precoder through a corresponding radio frequency link. Under the control of the controller, the digital precoder performs digital precoding on the received data using for example a digital precoding matrix W with a size of Ku×N (Ku is an integer and Ku≥1), thereby obtaining single-channel data (when Ku=1) or multiple-channel data (when Ku>1).

For digital precoding matrices used in digital precoders, there are usually two design schemes: codebook based and non-codebook based. In the codebook based design scheme, a digital precoding matrix must be selected from a predetermined codebook. While in the non-codebook based design scheme there is no such constraint. The base station terminal and the user terminal can design the precoding matrix according to Channel State Information (CSI).

In a millimeter wave communication system, since the implementation complexity and cost of a radio link is relatively high, each radio frequency link is usually used to connect multiple phase shifters and antennas to form a directional beam by using as few as one radio link, thereby achieving an analog beamforming scheme. The main role of the analog beamforming is to improve the signal-to-noise ratio of user reception.

Millimeter wave communication systems have multiple operating modes, such as point-to-point mode, single user mode, multi-user mode, etc. The point-to-point mode can be used for the backhaul between the base stations (BS), the single user and multi-user modes can be used for the communication between a base station and one or more user equipments (UE). In terms of implementation architecture, it may comprise analog beamforming, full-connection hybrid precoding, sub-link hybrid precoding and the like. Regardless of which architecture is adopted, weight vectors of the base station and user equipment can only be selected from a predefined analog codebook due to the limitation of the device constraints. Beam training refers to the process of selecting the optimal transmitting/receiving weight vectors from the analog codebook.

Figures 4A, 4B:
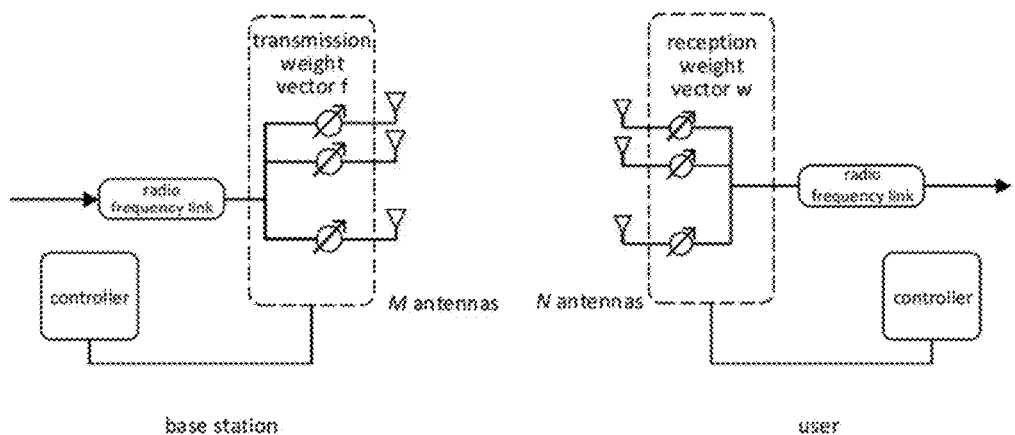
FIGS. 4a and 4b respectively show views of the configurations of a base station terminal and a user terminal in a single user system.

FIGS. 4a and 4b respectively show the configurations of a base station terminal and a user terminal in a single user system. As shown in FIG. 4a and FIG. 4b, in the user terminal and the base station terminal, each radio frequency link is connect to a set of phase shifters, and each phase shifter is then connected to corresponding antenna respectively. Values (e.g., phase values) of a set of the phase shifters form a weight vector used to transmit an antenna beam in a specific direction. In some examples, the parameters used to generate a beam are also referred to as a beam vector. Herein, the weight vector at the base station terminal is represented as f and the weight vector at the user terminal is represented as w. Since the phase shifter only adjusts the phase of a signal without changing its amplitude, the amplitude value of each element in the weight vector is 1. In a millimeter wave communication system having such structure, due to the limited number of radio frequency links, neither the base station terminal nor the user terminal can directly estimate the channel state information. Thus, the conventional analog beamforming scheme uses a codebook based method. The codebook is a collection of a set of weight vectors. suppose the base station terminal codebook is Fc with a size of P (including P weight vectors), the user terminal codebook is Wc with a size of Q (including Q weight vectors), weight vectors of the base station terminal must be selected from the base station terminal codebook Fc, and weight vectors of the user terminal must be selected from the user terminal codebook Wc.

When millimeter wave communication is performed by the base station terminal and the user terminal, which weight vector in the codebook is specifically adopted is determined in advance by beam training. The criterion of maximizing signal-to-noise ratio can be used in the beam training. Taking the downlink beam training as an example, it can be expressed by equation (1):

$$\{w_{opt}, f_{opt}\} = \text{argmax} \|w^T H f\| \text{ wherein } w \in W_c, f \in F_c \qquad (1)$$

In the above equation (1), H represents a channel between the base station terminal and the user terminal.

The beam training algorithm can use an exhaustive search method, a single feedback search method or the like. The following description will take the downlink beam training as an example.

1. Exhaustive Search. The exhaustive search algorithm detects all the possible combinations between weight vectors of the base station terminal and weight vectors of the user terminal, and the user terminal measures the channel quality under each pair of weight vectors, selects an optimal set of weight vectors, and feeds an index of the optimal weight vector of base station terminal back to the base station. The exhaustive search mechanism can achieve optimal performance, but resulting in extremely high complexity because of the need to detect all the combinations of the weight vectors.

In order to reduce the complexity of the beam training algorithm, it is possible to only select a portion of all the combinations between weight vectors of base station terminal and weight vectors of user terminal for detection. For example, it may be combinations between one weight vector in the base station terminal codebook and all the weight vectors in the user terminal codebook, or it may be combinations between one of the weight vectors in the user terminal codebook and all the weight vectors in the base station terminal codebook. For example, in one embodiment, one of the weight vectors in the user terminal codebook to be combined with all the weight vectors in the base station terminal codebook may be selected according to the channel qualities obtained from the combinations between one of the weight vectors in the base station terminal codebook and all the weight vectors in the user terminal codebook. A specific example is a single feedback search.

2. Single Feedback Search. In the single feedback search, beam training is divided into two processes. Downlink is still taken as an example. Firstly, the base station sends a signal (for example, a pilot signal) according to each weight vector in the base station terminal codebook, the user terminal receives the signal with an omni-directional beam (for example, a weight vector predetermined at the user terminal wherein only one antenna of the antenna array is used for reception) and estimates the channel quality corresponding to each weight vector in the base station terminal codebook, and then the user terminal selects a weight vector resulting in an optimal channel quality from the weight vector in the base station terminal codebook and feeds back its index to the base station. Then, the base station uses the weight vector selected by the user terminal fixedly to send signals, and the user terminal selects a weight vector with the highest channel quality from its codebook as the weight vector for communicating with the base station (i.e., calculating the channel quality obtained from the combinations between each weight vector in the user terminal codebook and the fixed weight vector of the base station terminal, and selecting a combination corresponding to the highest channel quality). Compared to the exhaustive search mechanism, the complexity of the single feedback mechanism is greatly reduced, but resulting in a certain loss of performance at the same time.

The above description is given by taking downlink transmission as an example. A similar process is performed in the process of uplink transmission, and the main difference is that the user terminal sends signals and the base station terminal receives the signals. In addition, the channel quality can be obtained by channel estimation. Channel direction and channel quality can be obtained by the channel estimation. The result of channel estimation may comprise a Channel Quality Indicator (CQI) and identification information of a corresponding set of parameters (index of optimal weight vector), and may also comprise multiple optimal CQIs and identification information of a set of parameters corresponding to each CQI.

Figures 5A, 5B:
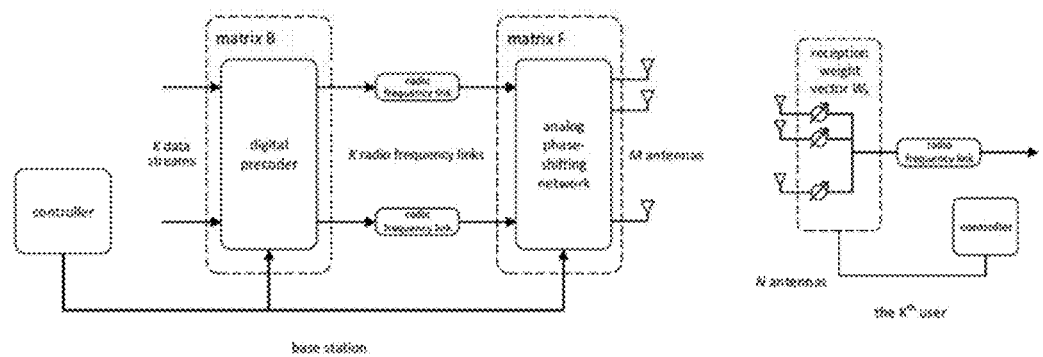
FIGS. 5a and 5b respectively show views of the configurations of a base station terminal and a user terminal under a hybrid precoding frame.

In a multi-user scenario, a millimeter-wave wireless communication system may also use a hybrid precoding architecture. FIGS. 5a and 5b respectively show the configurations of a base station terminal and a user terminal in a hybrid precoding architecture.

As shown in FIG. 5a, a base station terminal using a hybrid precoding architecture has a digital precoder and an analog phase-shifting network. Under the control of a controller, the digital precoder obtains K data streams as input, and the digital precoder performs digital precoding on the K data streams, thereby eliminating interference between different data streams. Then, K radio frequency (RF) links perform up-converting, amplifying, filtering and other processings on the data streams precoded by the digital precoder to form RF signals. Typically, each of the k RF links corresponds to a user terminal.

The K RF links are connected to an analog phase-shifting network. The values of phase shifters in the phase-shifting network constitute an analog beamforming matrix F. In the matrix F, the $k^{th}$ column indicates a set of values of phase shifters connected to the $k^{th}$ RF link and is represented as a weight vector $f_k$, the weight vector $f_k$ must be selected from a codebook fc of the base station terminal.

Figures 6A, 6B:
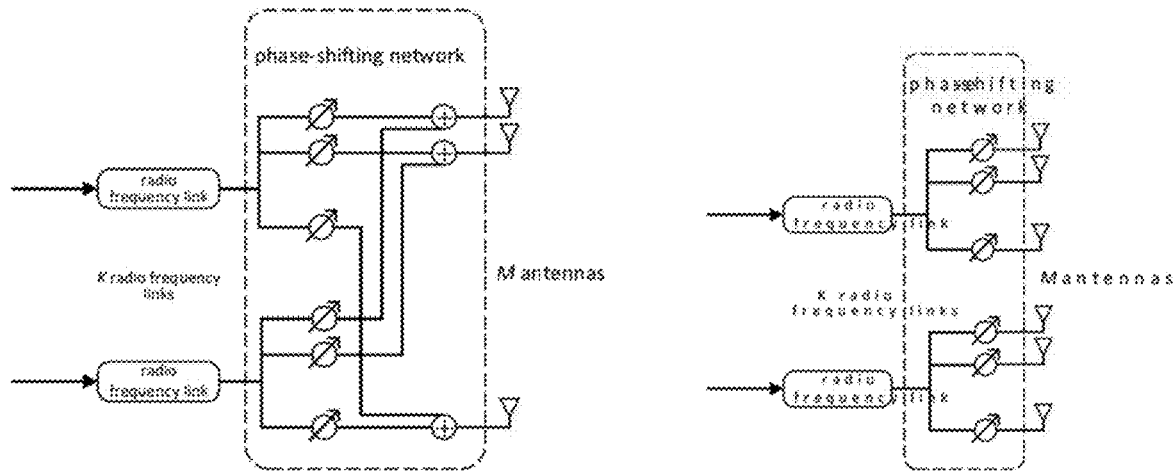
FIGS. 6a and 6b respectively show schematic views of a full-connection phase-shifting network and a sub-connection phase-shifting network.

For the phase-shifting network, it can be implemented in different ways. FIGS. 6a and 6b respectively show a full-connection phase-shifting network and a sub-connection phase-shifting network.

As shown in FIG. 6a, in a full-connection phase-shifting network, each RF link is connected to a set of M phase shifters, so that there are K sets of phase shifters in the full-connection phase-shifting network, and the total number of phase shifters is K×M. The signals output by corresponding phase shifter in each set of phase shifters (K signals) are added by an adder and then provided to a corresponding antenna unit.

As shown in FIG. 6b, in a sub-connection phase-shifting network, the output of each RF link is connected to P phase shifters (P is an integer and P≥1), and each phase shifter is connected to an antenna unit. That is, in the case where there are K RF links, the number of antenna elements is M=K×P.

FIG. 5b shows the configuration of the user terminal using a hybrid precoding architecture. As shown in FIG. 5b, the user terminal is configured with N antennas. Signals received by the antennas are inputted to a RF link after passing through corresponding phase shifters. The values of the phase shifters constitute a user terminal weight vector $w_k$, which can be selected from a user terminal codebook Wc. The input signal is filtered, amplified, and down-converted by the RF link to obtain a digital received signal.

In this example, the user terminal has only one RF link. According to actual situations, a design of multiple RF links may also be adopted on the user terminal.

In the hybrid precoding architecture, beam training is a process of determining weight vectors of the base station terminal and the user terminal. With downlink transmission as an example, the criterion of maximizing signal-to-noise ratio can be expressed by equation (2):

$$\{w_{k,opt},f_{k,opt}\}=\mathrm{argmax}\|w^T H_k f\| \text{ wherein } w\in W_c, f\in F \qquad (2)$$

Where $\{w_{k,opt},f_{k,opt}\}$ represents the optimal downlink weight vector of the $k^{th}$ user, $H_k$ is the downlink channel matrix between the base station and the $k^{th}$ user. The exhaustive search mechanism or single feedback search mechanism described above or other multi-user beam search mechanisms can be used in the beam training.

In a TDD system, uplink and downlink channels have reciprocity, i.e., $H^{ul}_k$ of the uplink channel=$H_k^T$, and where T denotes the transposition of a matrix. Therefore, in a TDD system, a combination between optimal base station terminal weight vector and user terminal weight vector in the uplink channel and a combination between optimal base station terminal weight vector and user terminal weight vector in the downlink channel are the same. It is only necessary to perform beam training on one of the uplink channel and the downlink channel. However, in a FDD system, since the uplink and downlink channels do not have reciprocity therebetween, it is necessary to perform beam training in the uplink channel and the downlink channel respectively, thereby the complexity of beam training is doubled than that in a TDD system.

The applicant noticed that although the uplink channel and the downlink channel in the FDD system are not reciprocal, according to the channel model proposed by WINNER, the small-angle fading parameters (such as the antenna arrival angles of the base station terminal and the user terminal) of the uplink channel and the downlink channel are the same. Particularly, the downlink channel matrix HDL and the uplink channel matrix $H^{UL}$ may be represented by the following equations (3) and (4), respectively:

$$H^{DL} = \sqrt{\frac{MN}{N_{cl}N_{ray}}} \sum_{i=1}^{N_{cl}} \sum_{l=1}^{N_{ray}} \alpha_{i,l} e^{j\psi_{i,l}^{DL}} a_{UE}^{DL}(\theta_{i,l}^{UE}, \phi_{i,l}^{UE}) a_{BS}^{DL}(\theta_{i,l}^{BS}, \phi_{i,l}^{BS})^H \qquad (3)$$

$$H^{UL} = \sqrt{\frac{MN}{N_{cl}N_{ray}}} \sum_{i=1}^{N_{cl}} \sum_{l=1}^{N_{ray}} \alpha_{i,l} e^{j\psi_{i,l}^{UL}} a_{BS}^{UL}(\theta_{i,l}^{BS}, \phi_{i,l}^{BS}) a_{UE}^{UL}(\theta_{i,l}^{UE}, \phi_{i,l}^{UE})^H \qquad (4)$$

In the above equations, N and M represent the numbers of antennas provided at the user terminal and the base station respectively, $N_{cl}$ is the number of scatterers, $N_{ray}$ is the number of sub-paths contained in each scatterer, and $\alpha_{i,l}$ represents the channel coefficient of each sub-path, e is the base of natural logarithms, and j is the imaginary unit. $a_{UE}$ and $a_{BS}$ respectively represent antenna response vectors of the user terminal and the base station terminal, the superscripts UL and DL represent uplink and downlink channels respectively, and θ and φ respectively represent the arrival angle in a horizontal direction and the arrival angle in a vertical direction. In addition, $\psi_{i,l}$ represents a random phase of each sub-path and is independently and uniformly distributed in [0, 2π]. The form of the antenna response vector is associated with the type of antenna. For example, in a case of a Uniform Linear Array (ULA) of antennas, the antenna response vector of base station is:

$$a_{BS}^{UL}(\theta) = \frac{1}{\sqrt{M}}\left[1, e^{j\frac{2\pi d}{\lambda_{UL}}\sin(\theta)}, \ldots, e^{j(M-1)\frac{2\pi d}{\lambda_{UL}}\sin(\theta)}\right]^T \qquad (5)$$

-continued $$a_{BS}^{DL}(\theta) = \frac{1}{\sqrt{M}} \left[ 1, e^{j\frac{2\pi d}{\lambda_{DL}} \sin(\theta)}, \ldots, e^{j(M-1)\frac{2\pi d}{\lambda_{DL}} \sin(\theta)} \right]^T \quad (6)$$

In the above equations (5) and (6), λ denotes wavelength, subscripts UL and DL denote uplink and downlink channels respectively, and d denotes antenna spacing. The antenna response vector of the user terminal can be obtained in a similar manner, which will not be described herein.

In a case of a Uniform Planar Array (UPA) of antennas, the antenna response vector of base station is:

$$a_{BS}^{UL}(\theta, \phi) = \quad (7)$$
$$\frac{1}{\sqrt{M}} \left[ 1, e^{j\frac{2\pi d}{\lambda_{UL}}(\sin(\theta)\sin(\phi)+\cos(\phi))}, \ldots, e^{j\frac{2\pi d}{\lambda_{UL}}((A-1)\sin(\theta)\sin(\phi)+(B-1)\cos(\phi))} \right]^T$$

$$a_{BS}^{DL}(\theta, \phi) = \quad (8)$$
$$\frac{1}{\sqrt{M}} \left[ 1, e^{j\frac{2\pi d}{\lambda_{DL}}(\sin(\theta)\sin(\phi)+\cos(\phi))}, \ldots, e^{j\frac{2\pi d}{\lambda_{DL}}((A-1)\sin(\theta)\sin(\phi)+(B-1)\cos(\phi))} \right]^T$$

In the above equations (7) and (8), A denotes the number of antennas in the horizontal direction, B denotes the number of antennas in the vertical direction, wherein M=A×B is satisfied. The antenna response vector of the user terminal can be obtained in a similar manner. Since a ULA antenna array can also be regarded as a special UPA antenna array with B=1, these two types of antenna are not distinguished in the specification of the present application, and a description will be given by taking the antenna response vector of a UPA antenna array as an example.

Based on the reciprocity of antenna arrival angles in uplink and downlink channels in a FDD system, the present application proposes a beam training method and a device for implementing the method. Information obtained from beam training in the uplink (downlink) channel is used to facilitate the beam training in the downlink (uplink) channel to achieve the purpose of reducing beam training overhead.

Figure 7A:
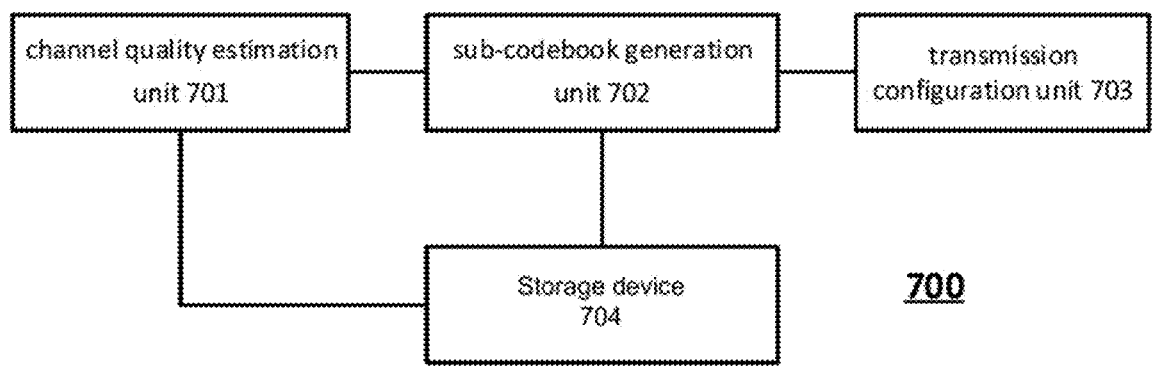
FIG. 7a shows a schematic view of an electronic device for a communication device in a wireless communication system according to an embodiment of the present disclosure.

FIG. 7a shows a schematic view of an electronic device used for a communication device in a wireless communication system according to an embodiment of the present disclosure. Here, the communication device may be a base station or a user equipment. Below, a discussion will be given with a communication device being a base station as an example.

As shown in FIG. 7a, the electronic device 700 includes a channel quality estimation unit 701, a sub-codebook generation unit 702, a transmission configuration unit 703, and a storage device 704.

The storage device 704 is used to store an analog codebook of the base station, which contains a plurality of sets of configuration parameters (i.e., multiple weight vectors) for a set of phase shifters in the base station.

The channel quality estimation unit 701 can estimate the channel quality of the uplink channel based on the analog codebook stored in the storage device 704 and signal (for example, a pilot signal or a reference signal, a training signal) from the user equipment. Wherein, the communication system to which the present invention is applied is, for example, an LTE system, and the signal from the user equipment is, for example, a Sounding Reference Signal (SRS) or an uplink reference signal specifically and newly defined for analog beamforming.

The sub-codebook generation unit 702 selects, from the analog codebook of the base station, a weight vector which has a corresponding channel quality equal to or higher than a predetermined threshold value based on the estimation result of the channel quality estimation unit 701, thereby generating an analog sub-codebook. Compared to the analog codebook of the base station, the analog sub-codebook may only include a portion of the weight vectors in the analog codebook, thereby achieving the reduction of the analog codebook.

The transmission configuration unit 703 is used for configuring the signal transmission of the base station, such that the beam training of downlink channel between the base station and the user equipment is based on the analog sub-codebook of base station. That is to say, in the beam training of the downlink channel, the base station sends a signal (such as pilot signal or reference signal, a training signal) based on the analog sub-codebook, and the user equipment evaluates the signal quality of the downlink channel according to the signal sent by the base station, to assist the base station in selecting an optimal weight vector (that is, the configuration parameters of the phase shifters) to perform data transmission of the downlink channel. Wherein, the communication system to which the present disclosure is applied is, for example, an LTE system. A signal sent by the base station is, for example, a channel state information reference signal (CSI-RS) or a downlink reference signal specifically and newly defined for analog beamforming. It should be understood that the above is described by taking the LTE system as an example. However, the technical solution of the present application is not limited to LTE system. In different communication systems, the signal sent by the base station may be other suitable reference signals, as long as beamforming can be performed.

Figure 7B:
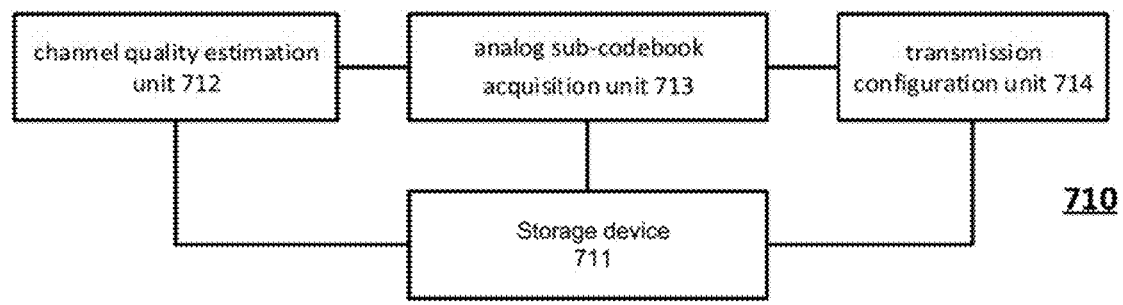
FIG. 7b shows a schematic view of an electronic device for another communication device in the wireless communication system according to an embodiment of the present disclosure.

FIG. 7b shows a schematic view of an electronic device used for another communication device in the wireless communication system according to an embodiment of the present disclosure. The another communication device is used for communicating with the communication device of FIG. 7a. For example, if the electronic device 700 of FIG. 7a is located in a base station, the another electronic device 710 of FIG. 7b is a user equipment. If the electronic device 700 of FIG. 7a is located in a user equipment, the another electronic device 710 of FIG. 7b is a base station. Below, a discussion will be given with an example where the electronic device is located in a user equipment.

As shown in FIG. 7b, the electronic device 710 includes a storage device 711, a channel quality estimation unit 712, an analog sub-codebook acquisition unit 713, and a transmission configuration unit 714. Wherein, the storage device 711 stores an analog codebook of the user equipment, which includes a plurality of sets of configuration parameters (i.e., weight vectors) for a set of phase shifters used in the user equipment.

The transmission configuration unit 714 configures the transmission of a signal (e.g., a pilot signal) from the user equipment to the base station based on the analog codebook to facilitate the base station to calculate the channel quality of the uplink channel based on the signal. For example, the transmission configuration unit 714 makes the values of the set of phase shifters of the user equipment equal to a set of configuration parameters (i.e., a weight vector) in the analog codebook, and sends a pilot signal to the base station in this case.

The analog sub-codebook acquisition unit 713 is used for acquiring an analog sub-codebook of the user equipment from the base station. The analog sub-codebook is obtained by reducing the analog codebook of the user equipment. The reducing process of analog codebook will be described in detail later.

The channel quality estimation unit 712 can estimate a channel quality of the downlink channel according to the analog sub-codebook stored in the storage device 711 and the signal (for example, a pilot signal) from the base station.

Those skilled in the art should understand that the electronic device used in the base station and the electronic device used in the user equipment described above may each include a processor or a processing circuit, by which various functional units are implemented.

Figure 8:
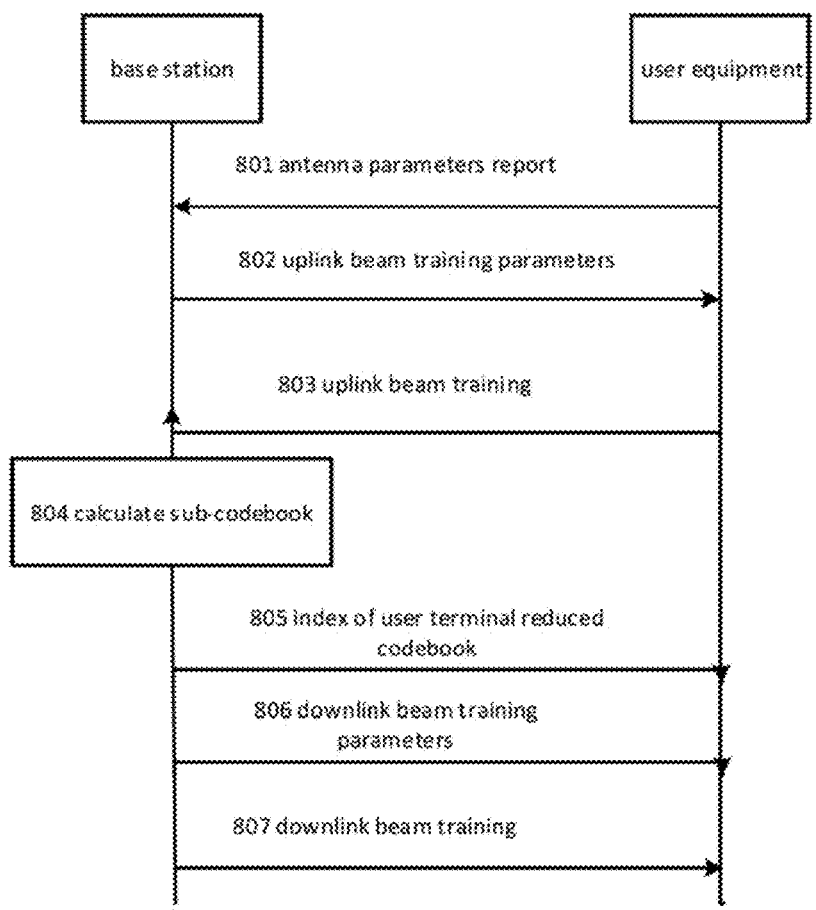
FIG. 8 shows a flowchart of performing beam training by using the electronic device of FIG. 7 in a base station according to an embodiment of the present disclosure.

FIG. 8 shows a flowchart of performing beam training by using the electronic device of FIG. 7 in a base station according to an embodiment of the present invention.

As shown in FIG. 8, in step 801, the user equipment reports antenna parameters of the user equipment to the base station. Here, the antenna parameters are, for example, the type of antenna (such as a linear antenna or a planar antenna), antenna spacing and the like. By using the antenna parameters, the base station can calculate the antenna response vector and the like of the user equipment to calculate a reduced analog codebook for the user equipment. The user equipment may send the antenna parameters before each beam training or only when accessing the network. In one example, the user equipment reports the antenna parameters of the user equipment to the base station by using higher layer dedicated signaling such as RRC signaling in LTE.

In step 802, the base station broadcasts uplink beam training parameters the user equipment, for example: start time and end time (e.g., sub-frame number) of the uplink beam training, the number of times that a training sequence will be transmitted, and the like.

In step 803, the user equipment sends a training sequence to the base station to perform uplink beam training. In the process of the uplink beam training, uplink beam training may be performed by using the exhaustive search method or the single feedback search method described above. In addition, in this step, the base station uses the channel quality estimation unit 701 to estimate a channel quality based on the training sequence.

Figure 9:
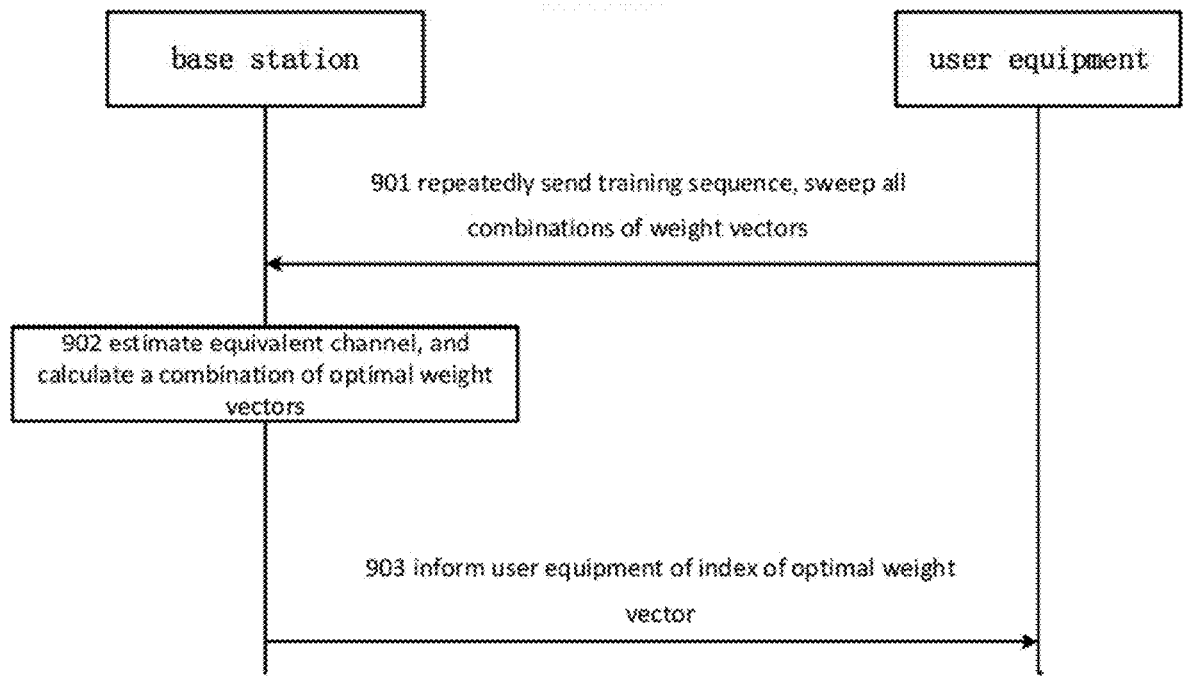
FIG. 9 shows a flowchart of performing uplink beam training by using an exhaustive search method according to an embodiment of the present disclosure.

FIG. 9 shows a flowchart of performing uplink beam training by using an exhaustive search method according to an embodiment of the present invention.

As shown in FIG. 9, in step 901, the user equipment sends an uplink beam training sequence based on the uplink beam training parameters from the base station. Here, the number of times that the training sequence will be transmitted may depend on the size of the analog codebook of the base station and the size of the analog codebook of the user equipment. For example, if the analog codebook of the base station comprises P weight vectors (that is, the size of the analog codebook of the base station is P), the analog codebook of the user equipment comprises Q weight vectors (that is, the size of the analog codebook of the user equipment is Q), the number of times that the uplink beam training sequence needs to be transmitted is equal to P×Q.

In step 902, the base station estimates an equivalent channel based on the received training sequence, and calculates an optimal combination of weight vectors. That is, based on the training sequence, the base station can calculate which combination may result in the best channel quality among all the combinations between the weight vectors in the analog codebook of the base station and the weight vectors in the analog codebook of the user equipment. In subsequent uplink communications, the base station and the user equipment will communicate by using the selected pair of weight vectors.

In step 903, the base station informs the user equipment of the result of its calculation. That is, the base station informs the user equipment which weight vector in the analog codebook of the user equipment is to be used for communications in the uplink channel. In general, the base station informs the user equipment of the index of the weight vector in the analog codebook of the user equipment. In another embodiment, the base station may also inform the user equipment of the index of a receiving weight vector to be used by the base station together.

Through the above steps 901-903, the weight vectors respectively used by the base station and the user equipment in uplink communication are obtained, so that uplink communication can be performed smoothly.

Besides the exhaustive search method described above, other methods can also be used. For example, it is possible to use only a part of all the combinations between the weight vectors in the analog codebook of the user equipment and the weight vectors in the analog codebook of the base station. For example, in one embodiment, these combinations may comprise: combinations between a weight vector in an analog codebook of the base station and all weight vectors in the analog codebook of the user equipment, and combinations between a weight vector in the analog codebook of the user equipment and all weight vectors in the analog codebook of the base station. In a preferred embodiment, according to channel qualities obtained from combinations between one of the weight vectors in the analog codebook of the base station and all the weight vectors in the analog codebook of the user equipment, one weight vector to be combined with all the weight vectors in the analog codebook of the base station is selected from the weight vectors in the analog codebook of the user equipment. This is the single feedback search method that will be described below.

Figure 10:
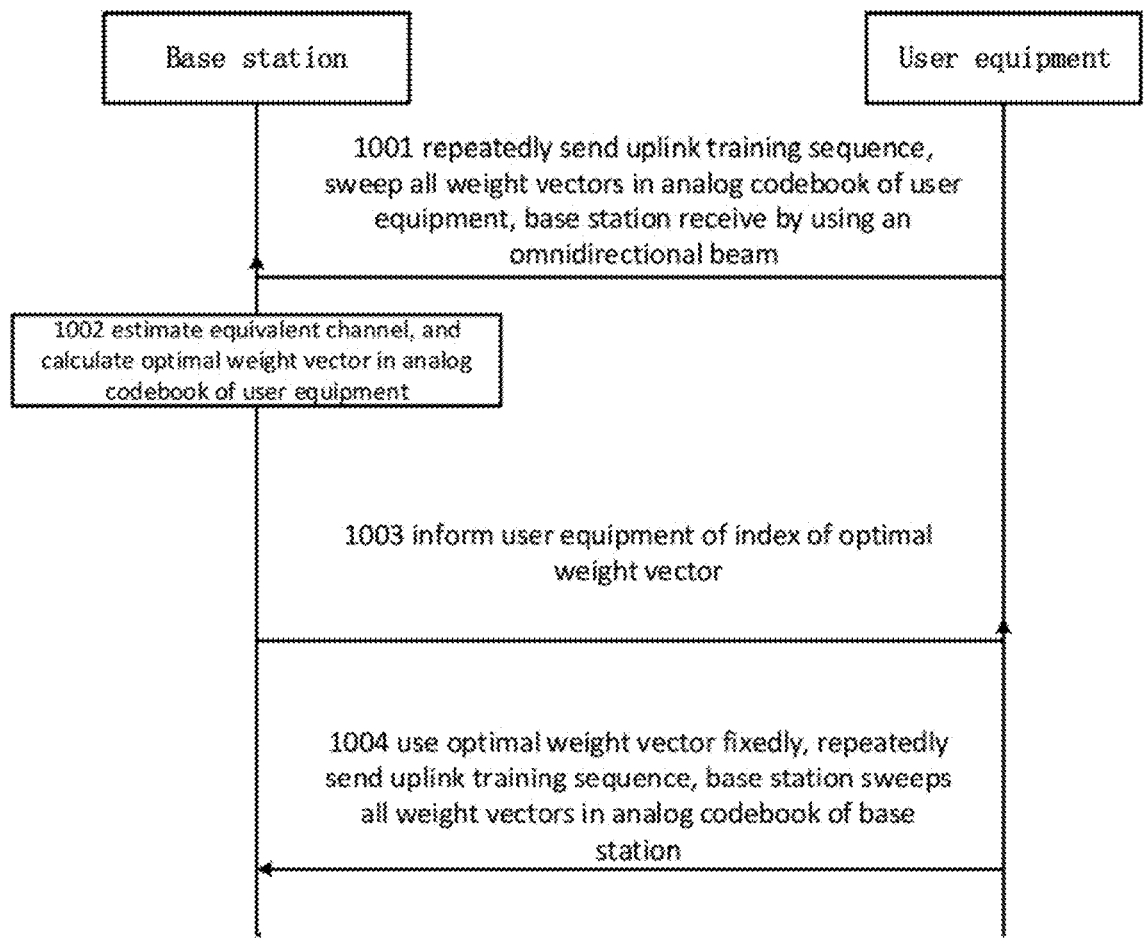
FIG. 10 shows a flowchart of performing uplink beam training by using a single feedback search method according to an embodiment of the present disclosure.

FIG. 10 shows a flowchart of performing uplink beam training by using a single feedback search method according to an embodiment of the present invention.

As shown in FIG. 10, in step 1001, the user equipment repeatedly sends an uplink beam training sequence according to the uplink beam training parameters sent by the base station. In the single feedback method, since the base station receives the training sequence by using an Omni-directional beam (i.e., using a predetermined weight vector), it is only necessary to sweep all the weight vectors in the analog codebook of the user equipment. Therefore, the uplink beam training sequence will be transmitted for Q times (i.e. equal to the size of the analog codebook of the user equipment), and a different weight vector in the analog codebook of the user equipment is used each time.

In step 1002, the base station estimates an equivalent channel (e.g., it may be expressed as $f_{omni}^T H^{UL} w$) based on the received training sequence, where w∈Wc, and calculates a channel quality. The base station selects a weight vector $W_{opt}$ from the analog codebook of the user equipment that corresponds to the best channel quality as the weight vector to be used by the user equipment in the subsequent uplink channel transmission.

In step 1003, the base station informs the user equipment of index of the weight vector selected in step 1002.

In step 1004, the user equipment continuously sends the uplink beam training sequence by using the weight vector selected by the base station. The base station sweeps all the weight vectors in the analog codebook of the base station according to the training sequence sent by the user equipment. Since the base station will sweep all the weight vectors in the analog codebook of the base station based on these training sequences, the training sequence will be repeated P times (i.e., it is equal to the size of the analog codebook of the base station).

In step 1005, the base station estimates an equivalent channel (e.g., it may be represented as $f^T H^{UL} w_{opt}$) where $f^T \in Fc$, and calculates an optimal weight vector $f_{opt}$ in the analog codebook of the base station. Here, the base station calculates channel qualities obtained with weight vectors in the analog codebook of base station according to the training sequence, and selects a weight vector corresponding to an optimal channel quality therefrom as the weight vector for subsequent uplink communication with the user equipment.

In this way, through the above steps 1001-1005, the weight vectors used by the base station and the user equipment respectively for uplink communication are determined, so that the uplink communication can be performed by using the determined optimal weight vectors.

Next, return to the flowchart of beam training shown in FIG. 8. In step 804, the base station will use the sub-codebook generation unit 702 to reduce the analog codebook to obtain a sub-codebook for reverse communication.

Figure 11:
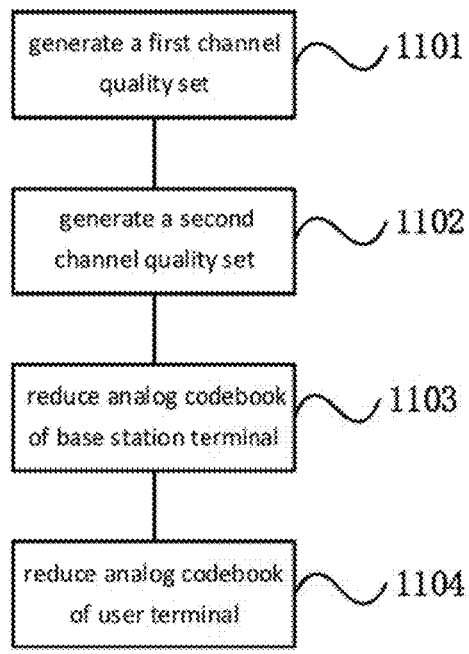
FIG. 11 shows a flowchart of a method for reducing an analog codebook according to an embodiment of the present disclosure.

FIG. 11 shows a flowchart of a method for reducing an analog codebook according to an embodiment of the present application.

In step 1101, the base station selects a corresponding channel quality for each weight vector in the analog codebook of the base station according to the channel qualities, thereby forming a first set of channel qualities. Since the base station has already calculated the channel qualities in various combinations between the weight vectors in the analog codebook of the user equipment and the weight vectors in the analog codebook of the base station based on the received uplink beam training sequence, in the case that the number of the weight vectors in the analog codebook of the user equipment is greater than 1, each weight vector in the analog codebook of the base station will be combined with the various weight vectors in the analog codebook of the user equipment. As such, each weight vector in analog codebook of the base station may correspond to multiple channel qualities. In a preferred embodiment, the highest one is selected from the channel qualities corresponding to each weight vector in the analog codebook of the base station. In this way, in the first set of channel qualities, each weight vector in the analog codebook of the base station has a corresponding channel quality.

In step 1102, the base station selects a corresponding channel quality for each weight vector in the analog codebook of the user equipment according to the channel qualities, thereby forming a second set of channel qualities. Similarly as above, each weight vector in the analog codebook of the user equipment may correspond to multiple channel qualities. In a preferred embodiment, the base station selects the highest one from multiple channel qualities corresponding to each weight vector in the analog codebook of the user equipment. In this way, in the second set of channel qualities, each weight vector in analog codebook of the user equipment has a corresponding channel quality.

In step 1103, a first predetermined number of channel qualities are selected from the first set of channel qualities and an analog sub-codebook of the base station is generated according to the weight vectors corresponding to the first predetermined number of channel qualities. Here, the specific numerical value of the first predetermined number may be selected according to the size of the analog codebook of the base station. For example, if the analog codebook of the base station contains a very large number (for example, 2000) of weight vectors, in order to reduce the beam training overhead, only a small portion of them may be selected (it can be determined according to requirements on system performance, for example, 20). In another example, it is also possible to additionally take the size of the analog codebook of the user equipment into consideration. The overhead of beam training is also related to the size of the analog codebook of the user equipment. Therefore, when determining the specific numerical value of the first predetermined number, the size of the analog codebook of the base station and the size of the analog codebook of the user equipment may be considered at the same time.

In step 1104, a second predetermined number of channel qualities are selected from the second set of channel qualities, and an analog sub-codebook of user terminal is generated according to the weight vectors corresponding to the second predetermined number of channel qualities. Similar to step 1103, the specific numerical value of the second predetermined number may be selected according to the size of the analog codebook of the user equipment. In another example, it is also possible to additionally take the size of the analog codebook of the base station into consideration.

In the method described above with reference to FIG. 11, it is not necessary to perform the various steps sequentially, and some steps may be performed in parallel. For example, steps 1101 and 1102 may be performed simultaneously, and steps 1103 and 1104 may also be performed simultaneously.

Next, return to FIG. 8. Subsequently, in step 805, the base station informs the user equipment of the analog sub-codebook of the user equipment generated in step 1104. In one example, the base station does not have to send the analog sub-codebook of the user equipment itself, instead it only needs to send indexes of the analog sub-codebook to reduce signaling overhead. Based on the indexes, the user equipment can determine which weight vectors are included in the analog sub-codebook.

In step 806, the base station sends the parameters of the downlink beam training to the user equipment. As described above, in the FDD system, since the uplink and downlink channels do not have reciprocity, it is necessary to perform uplink and downlink beam training separately. Therefore, before continue to performing downlink beam training, the base station needs to send the parameters of the downlink beam training to the user equipment. Here, the parameters of downlink beam training comprise, for example, start time and end time of downlink beam training, the number of times that a training sequence will be transmitted, and the like.

In step 807, downlink beam training is performed between the base station and the user equipment. In the training process, the base station uses the analog sub-codebook determined in step 1103 of FIG. 11, and the user equipment uses the analog sub-codebook determined in step 1104 of FIG. 11. Since both the base station and the user equipment use the analog sub-codebooks for downlink beam training, the overhead of downlink beam training is reduced.

The process of downlink beam training is similar to the uplink beam training except using different analog codebooks. For example, the exhaustive search and single feedback search methods can also be used in downlink beam training.

Figure 12:
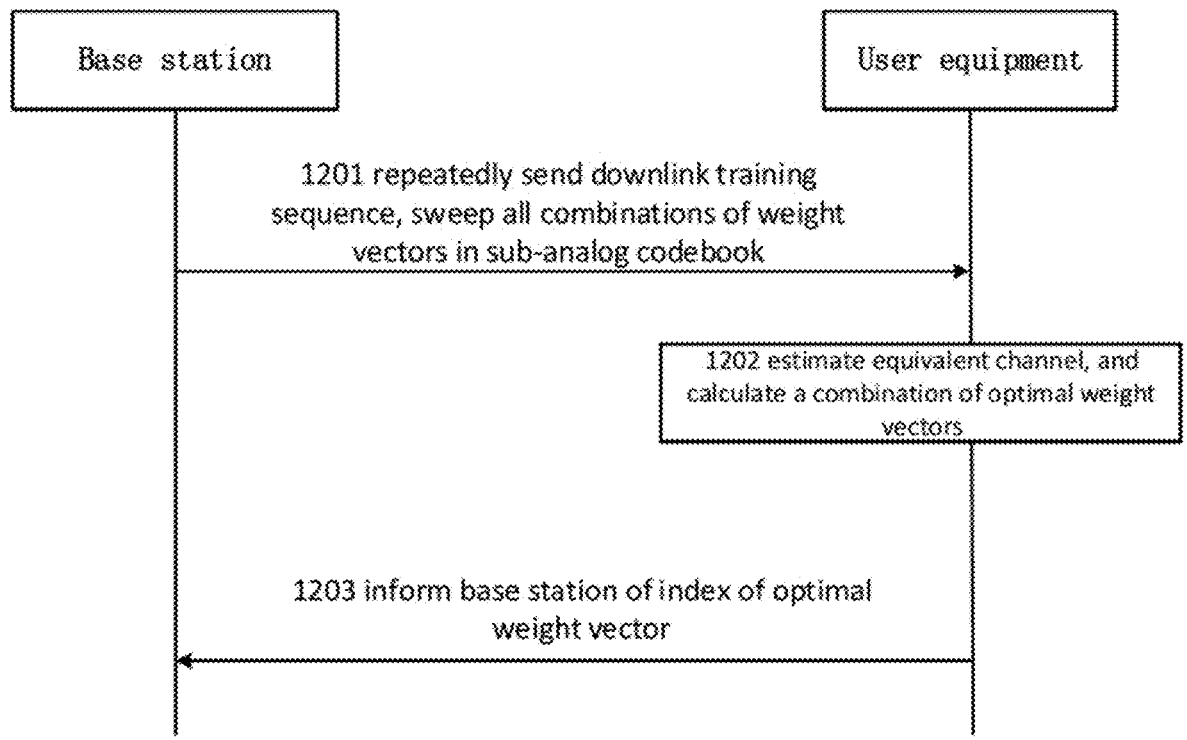
FIG. 12 shows a flowchart of performing downlink beam training with an exhaustive search scheme.

FIG. 12 shows a flowchart of performing downlink beam training by using to the exhaustive search method. As shown in FIG. 12, in step 1201, the base station repeatedly sends a training sequence for downlink beamforming. Here, the number of times that the training sequence will be transmitted may depend on the size of the analog sub-codebook of the base station and the size of the analog sub-codebook of the user equipment. For example, if the analog sub-codebook of the base station comprises Ps weight vectors, and the analog sub-codebook of the user equipment comprises Qs weight vectors, the number of times that the training sequence for downlink beamforming needs to be transmitted is equal to Ps×Qs.

In step 1202, the user equipment estimates an equivalent channel based on the received training sequence and calculates an optimal combination of weight vectors. That is, based on the training sequence, the user equipment can calculate which combination may result in the best channel quality among all the combinations between the various weight vectors in the analog sub-codebook of the base station and the various weight vectors in the analog sub-codebook of the user equipment. In subsequent downlink communications, the base station and the user equipment will communicate by using the selected pair of weight vectors.

In step 1203, the user equipment informs the base station of the result of its calculation. That is, the user equipment informs the base station which weight vector in the analog sub-codebook of the base station is to be used for the communications in the downlink channel. In general, the user equipment informs the base station of an index of the weight vector in the analog sub-codebook of the base station. In another embodiment, the user equipment may also inform the base station of an index of the weight vector to be used by the user equipment together.

Through the above steps 1201-1203, the weight vectors used by the base station and the user equipment respectively in downlink communication are obtained, so that downlink communication can be performed smoothly.

Figure 13:
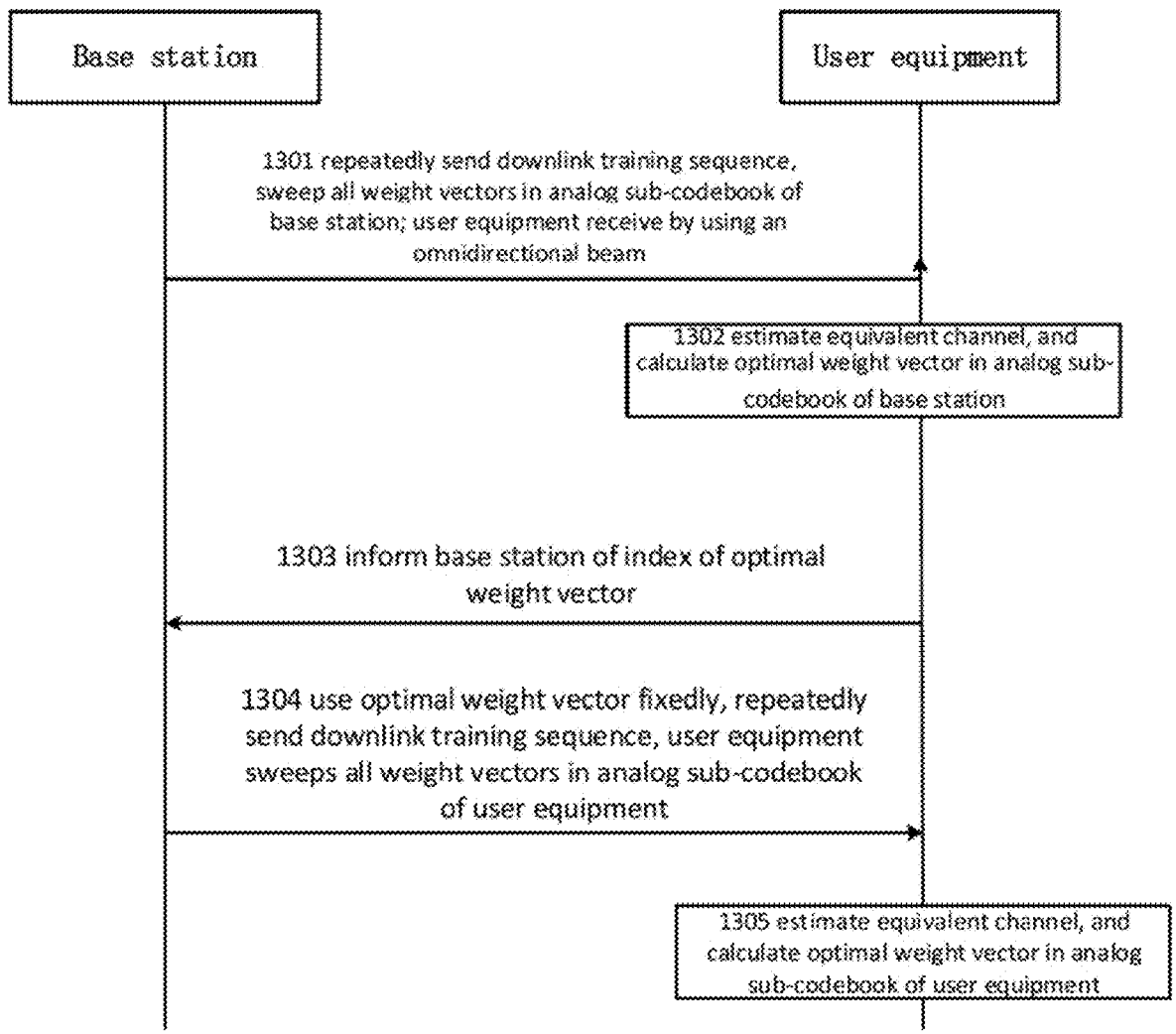
FIG. 13 shows a flowchart of performing downlink beam training with a single feedback search scheme.

FIG. 13 shows a flowchart of performing downlink beam training using the single feedback search method.

As shown in FIG. 13, in step 1301, the base station repeatedly sends a downlink beam training sequence according to downlink beam training parameters. In the single feedback method, since the user equipment receives the training sequence by using an Omni-directional beam (i.e., using a predetermined weight vector), it is only necessary to sweep all the weight vectors in the analog sub-codebook of the base station. Therefore, the downlink beam training sequence will be transmitted for Ps times (i.e. it is equal to the size of the analog sub-codebook of the base station), by using a different weight vector in the analog sub-codebook of the base station each time.

In step 1302, the user equipment estimates an equivalent channel based on the received training sequence and calculates a channel quality. The user equipment selects a weight vector from the analog sub-codebook of the base station that corresponds to the best channel quality as the weight vector to be used by the base station in the subsequent downlink channel transmission.

In step 1303, the user equipment informs the base station of an index of the weight vector selected in step 1302.

In step 1304, the base station sends the downlink beam training sequence by using the weight vector selected by the base station. The user equipment sweeps all the weight vectors in the analog sub-codebook of the user equipment according to the training sequence sent by the base station. Since the user equipment will sweep all the weight vectors in the analog sub-codebook of the user equipment based on these training sequences, the training sequences will be repeated Qs times (i.e., it is equal to the size of the analog sub-codebook of the user equipment).

In step 1305, the user equipment estimates an equivalent channel and calculates an optimal weight vector in the analog sub-codebook of the user equipment. Here, the user equipment calculates channel qualities obtained with various weight vectors in the analog sub-codebook of the user equipment according to the training sequence, and selects a weight vector corresponding to an optimal channel quality therefrom as the weight vector for subsequent downlink communication with the base station.

In this way, through the above steps 1301-1305, the weight vectors used by the base station and the user equipment respectively for downlink communication are determined, so that downlink communication can be performed by using the determined optimal weight vectors.

Figure 14:
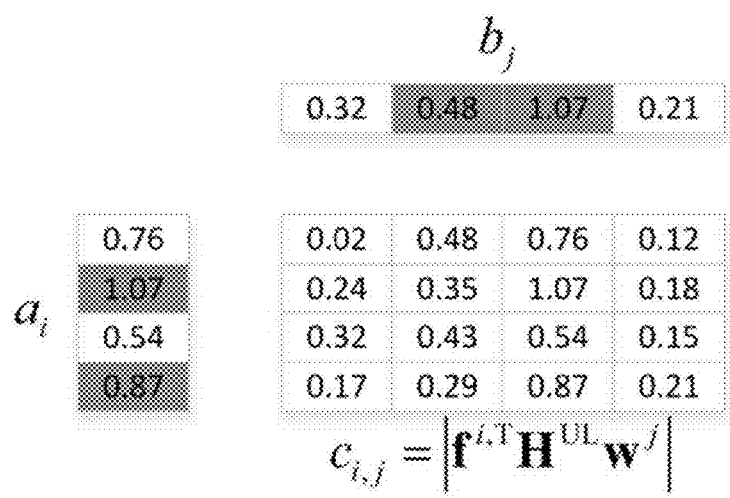
FIG. 14 shows an example of reducing an analog codebook with an exhaustive search algorithm.

FIG. 14 shows an example of reducing an analog codebook with an exhaustive search algorithm.

As shown in FIG. 14, by using an exhaustive search algorithm in the uplink beam training, the base station can obtain channel qualities $c_{i,j}=|f^{i,T}H^{UL}w^j|$ under all combinations of the weight vectors, wherein $1 \leq i \leq P$, $1 \leq j \leq Q$. Wherein $a_i$ is the best channel quality reached by the base station when its weight vector is $f^i$, i.e., $$a_i = \max_j c_{i,j}, 1 \leq i \leq P.$$

$b_j$ is the best channel quality reached by the user equipment when its weight vector is $w^j$, i.e., $$b_j = \max_i c_{i,j}, 1 \leq j \leq Q.$$

After obtaining the sets $\{a_1, a_2, \ldots, a_P\}$ and $\{b_1, b_2, \ldots, b_Q\}$, the largest Ps elements and Qs elements are selected therefrom respectively, and the corresponding weight vectors form the analog sub-codebook of the base station and the analog sub-codebook of the user equipment. In the example of FIG. 14, P=Q=4, Ps=Qs=2, and the gray positions in the figure indicate the indexes of the weight vectors in the obtained analog sub-codebooks.

Figure 15:
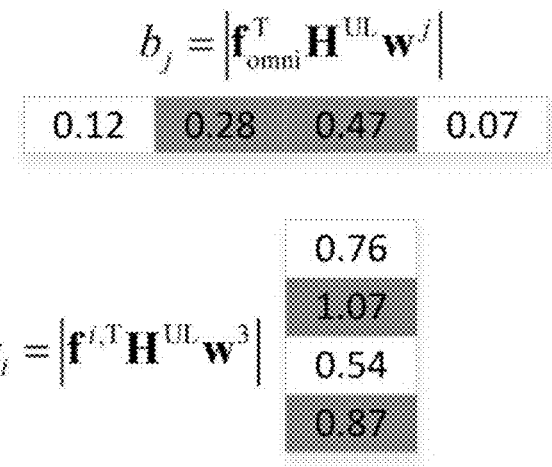
FIG. 15 shows an example of reducing an analog codebook with a single feedback search algorithm.

FIG. 15 shows an example of reducing an analog codebook with a single feedback search algorithm.

As shown in FIG. 15, in the single feedback search algorithm, the user equipment sweeps all the weight vectors $1 \leq j \leq Q$ in the analog codebook of the user equipment, and the base station receives and measures channel qualities by using an omni-directional beam $f_{omni}$, and selects therefrom a weight vector resulting in the best channel quality ($w_{opt}=\text{argmax}|f_{omni}^T H^{UL} w|$, wherein $w \in W_c$) and feeds it back to the user equipment. Then, the user equipment uses the optimal weight vector $w_{opt}$ fixedly, and the base station sweeps all the weight vectors $f^i$, $1 \leq i \leq P$ in the analog codebook of the base station, and selects a weight vector resulting in the best channel quality therefrom ($f_{opt}=\text{argmax}|f^T H^{UL} w_{opt}|$, wherein $f \in F_c$). Therefore, if the single feedback algorithm is used in uplink beam training, the base station can only obtain channel quality information under a part of the combinations between the weight vectors of the base station and the user equipment, in this case, $a_i=|f^{i,T}H^{UL}w_{opt}|$, $b_j=|f_{omni}H^{UL} w^j|$. The largest Ps elements and Qs elements are respectively selected from sets $\{a_1, a_2, \ldots, a_P\}$ and $\{b_1, b_2, \ldots, b_Q\}$, and weight vectors corresponding thereto form the analog sub-codebook Fs of the base station and the analog sub-codebook Ws of the user equipment. As shown in FIG. 15, P=Q=4, Ps=Qs=2, and the gray positions in the figure indicate the indexes of the weight vectors in the obtained analog sub-codebooks.

All the above description is to reduce the analog codebook(s) of the base station and/or the user equipment based on uplink beam training, so as to obtain the analog sub-codebooks used for downlink communication of the base station and/or the user equipment. The overhead of downlink beam training is reduced by using analog sub-codebooks in downlink beam training. However, the particular implementations of the present application are not limited to the above embodiments. Those skilled in the art should understand that the analog codebook(s) of the base station and/or the user equipment may also be reduced based on downlink beam training to obtain the analog sub-codebook(s) of the base station and/or the user equipment. The overhead of uplink beam training is reduced by using analog sub-codebooks in the process of uplink beam training.

In addition, in the above embodiment, both the analog codebook of the base station and the analog codebook of the user equipment are reduced. In practical applications, the technical effect of reducing the beam training overhead can also be achieved by only reducing the analog codebook of the base station or only reducing the analog codebook of the user equipment.

Further, in another embodiment of the present application, the analog sub-codebooks of the base station and the user equipment may further be corrected.

Figure 16A:
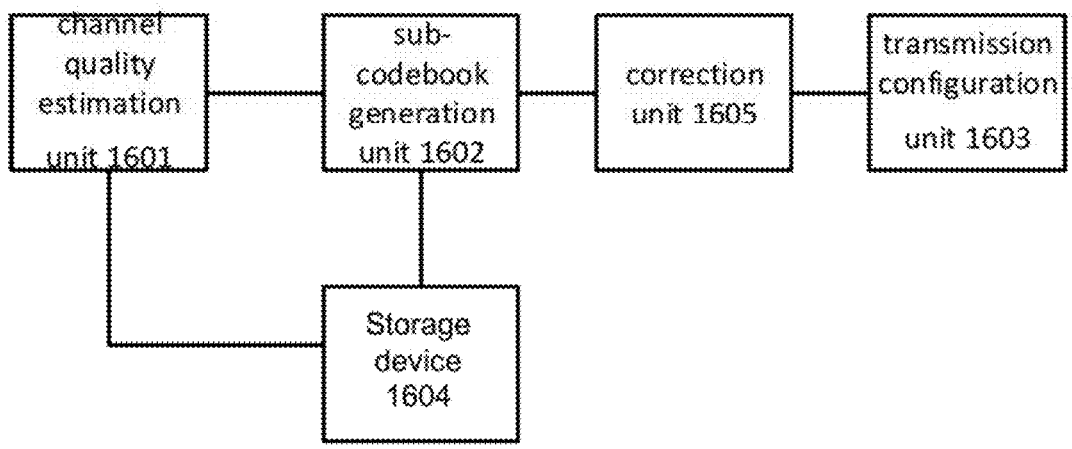
FIGS. 16a and 16b respectively show schematic views of structures of the electronic devices used for a base station and a user equipment according to another embodiment of the present disclosure.
Figure 16B:
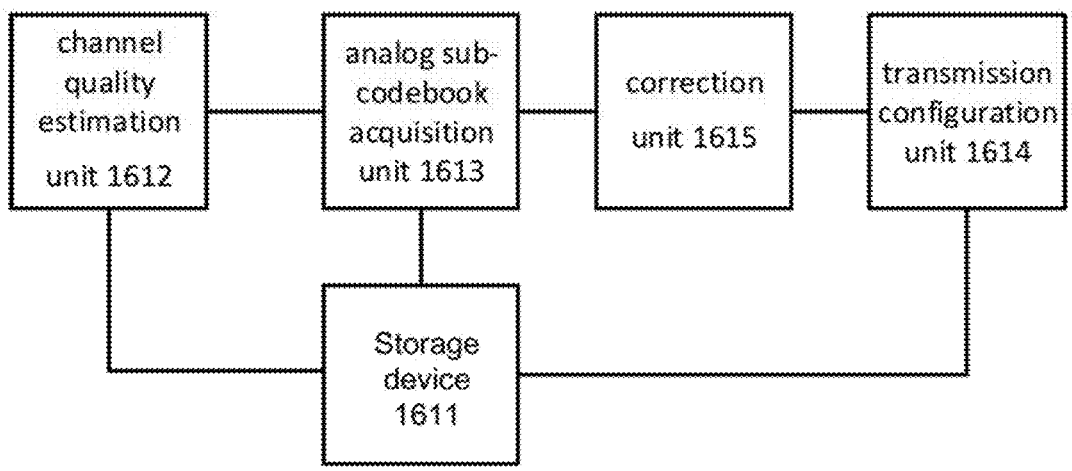

FIGS. 16a and 16b are schematic views respectively showing the electronic device structures used for a base station and a user equipment according to another embodiment of the present application.

As shown in FIG. 16a, the electronic device used for the base station comprises a channel quality estimation unit 1601, a sub-codebook generation unit 1602, a correction unit 1605, a transmission configuration unit 1603, and a storage device 1604. Wherein, the channel quality estimation unit 1601, the sub-codebook generation unit 1602, the transmission configuration unit 1603, and the storage device 1604 are similar to the channel quality estimation unit 701, the sub-codebook generation unit 702, the transmission configuration unit 703, and the storage device 704 shown in FIG. 7a, and the same functions of these components will not be repeated herein.

The correction unit 1605 may comprise a first correction unit (not shown). Wherein, the first correction unit is used to correct the analog sub-codebook of the base station. In addition, in another embodiment, the correction unit 1605 may further comprise a second correction unit (not shown) for correcting the analog sub-codebook of the user equipment.

The correction processes of the first correction unit and the second correction unit will be separately described below, still with an example in which analog codebook used in downlink beam training is reduced by uplink beam training.

In the correction process of the first correction unit, the analog sub-codebook of the base station will be corrected according to an uplink signal transmission frequency between the base station and the user equipment, and the corrected analog sub-codebook is used to perform the downlink beam training.

Figure 17:
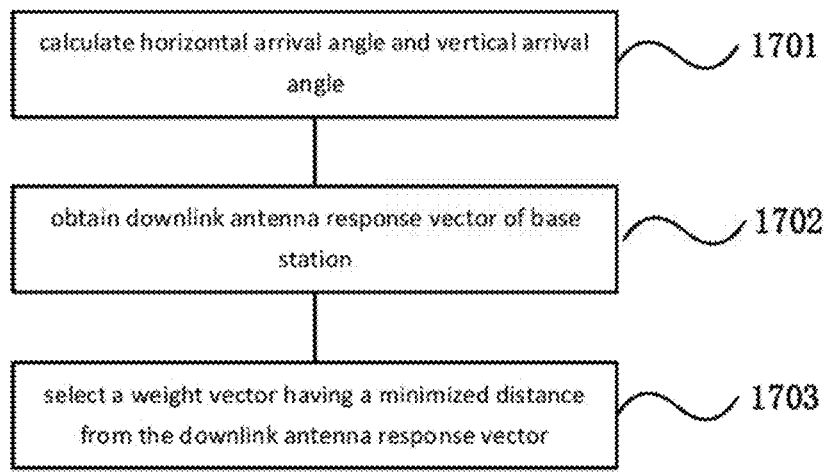
FIG. 17 shows a diagram of correcting an analog sub-codebook of a base station according to an embodiment of the present disclosure.

The specific steps are as shown in FIG. 17. In step 1701, for each weight vector in the analog sub-codebook of the base station, a horizontal arrival angle and a vertical arrival angle that minimizes the distance between the weight vector and each base station terminal antenna response vector of the uplink channel is calculated. That is, for a weight vector $f_{in}$ in the analog sub-codebook of the base station, its corresponding horizontal arrival angle $\theta_{in}$ and vertical arrival angle $\varphi_{in}$ are calculated, which satisfy the following conditions $$\{\theta_{in}, \varphi_{in}\} = \underset{\theta, \varphi}{\mathrm{argmin}} \| f_{in} - a_{BS}^{UL}(\theta, \varphi) \|_2$$

Wherein $a_{BS}^{UL}(\theta,\varphi)$ is the base station terminal antenna response vector of the uplink channel.

In step 1702, by using the reciprocity between the antenna arrival angles of the uplink and downlink channels in the FDD system, a first antenna response vector of the base station terminal of the downlink channel corresponding to the horizontal arrival angle $\theta_{in}$ and the vertical arrival angle $\varphi_{in}$ calculated in step 1701 is obtained.

In step 1703, a weight vector having the smallest distance from the first antenna response vector described above is selected from the analog codebook of the base station as a corrected weight vector. That is to say, suppose the corrected weight vector is $f_{out}$, then $$f_{out} = \underset{f \in F}{\mathrm{argmin}} \| f - a_{BS}^{DL}(\theta_{in}, \varphi_{in}) \|_2$$

Wherein $a_{BS}^{UL}(\theta,\varphi)$ is the base station terminal antenna response vector of the downlink channel, and F is the analog codebook of the base station.

The above correction process is performed for each weight vector in the analog sub-codebook of base station to finally obtain a corrected analog sub-codebook. The transmission configuration unit 703 will use the corrected analog sub-codebook to configure the base station so that the base station uses the corrected analog sub-codebook in downlink beam training.

In the correction process of the second correction unit, the analog sub-codebook of the user equipment will be corrected according to an uplink signal transmission frequency between the base station and the user equipment and the antenna configuration of the user equipment, and the corrected analog sub-codebook is used to perform downlink beam training. Correspondingly, the base station will inform the user equipment of the corrected analog sub-codebook of the user equipment (for example through step 805 shown in FIG. 8). As a variation of the example, the second correction unit is provided on the user equipment side instead of the base station side, that is, after the user equipment obtains an uncorrected analog sub-codebook, it can correct the analog sub-codebook according to the uplink signal transmission frequency by itself. In this example, the user equipment does not need to inform the base station of its antenna configuration information, thereby reducing signaling overhead. When the second correction unit is provided on the user equipment side, the base station will inform the user equipment of a pre-corrected analog sub-codebook of user equipment (for example, through step 805 of FIG. 8).

Figure 18:
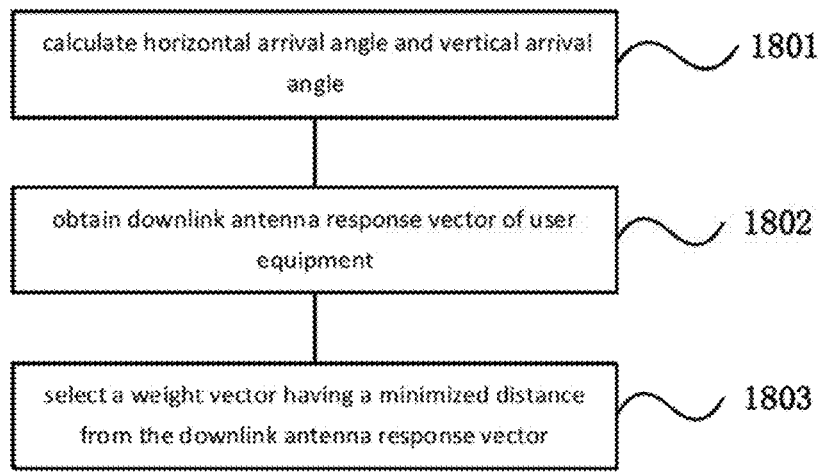
FIG. 18 shows a diagram of correcting an analog sub-codebook of a user equipment according to an embodiment of the present disclosure.

The specific steps are as shown in FIG. 18. In step 1801, for each weight vector in the analog sub-codebook of the user equipment, a horizontal arrival angle and a vertical arrival angle that minimizes the distance between the weight vector and each user equipment terminal antenna response vector of the uplink channel is calculated. For a weight vector $w_{in}$ in the analog sub-codebook of the user equipment, its corresponding horizontal arrival angle $\theta_{in}$ and a vertical arrival angle $\varphi_{in}$ are calculated, which satisfy the following condition:

$$\{\theta_{in}, \varphi_{in}\} = \operatorname*{argmin}_{\theta,\varphi}\|w_{in} - a_{UE}^{UL}(\theta, \varphi)\|_2$$

Wherein $a_{BS}^{UL}(\theta,\varphi)$ is the user equipment terminal antenna response vector of the uplink channel.

In step 1802, by using the reciprocity between the antenna arrival angles of the uplink and downlink channels in the FDD system, a second antenna response vector of the user equipment terminal of the downlink channel corresponding to the horizontal arrival angle and the vertical arrival angle calculated in step 1801 is obtained.

In step 1803, a weight vector having the smallest distance from the second antenna response vector is selected from the analog codebook of the user equipment as a corrected weight vector. That is to say, suppose the corrected weight vector is $w_{out}$, then it satisfies $$w_{out} = \operatorname*{argmin}_{w \in W}\|w - a_{UE}^{DL}(\theta_{in}, \varphi_{in})\|_2$$

Where $a_{BS}^{UL}(\theta,\varphi)$ is the user equipment terminal antenna response vector of the downlink channel, and W is the analog codebook of the user equipment.

As described above, the analog sub-codebooks of the base station and the user equipment are corrected according to the uplink signal transmission frequency between the base station and the user equipment and the antenna configuration of the user equipment, and downlink beam training is performed by using the corrected analog sub-codebook.

In another embodiment, firstly, downlink beam training is performed, and the analog codebook(s) of the base station and/or the user equipment is reduced based on the result of the downlink beam training to obtain an analog sub-codebook(s) for uplink communication of the base station and/or the user equipment. In such an embodiment, as shown in FIG. 16b, a correction unit 1615 may also be disposed in the electronic device of the user equipment, the analog sub-codebook of the user equipment is corrected according to an uplink signal transmission frequency between the base station and the user equipment and the antenna configuration of the user equipment, and uplink beam training is performed by using the corrected analog sub-codebook. Optionally, the correction unit 1615 may also correct the analog sub-codebook of the base station according to the uplink signal transmission frequency between the base station and the user equipment and the antenna configuration of the base station, so that the base station performs uplink beam training by using the corrected analog sub-codebook. It can be understood that the user equipment may inform the base station of an uncorrected analog sub-codebook of base station, and the base station may correct it by itself.

Figure 19:
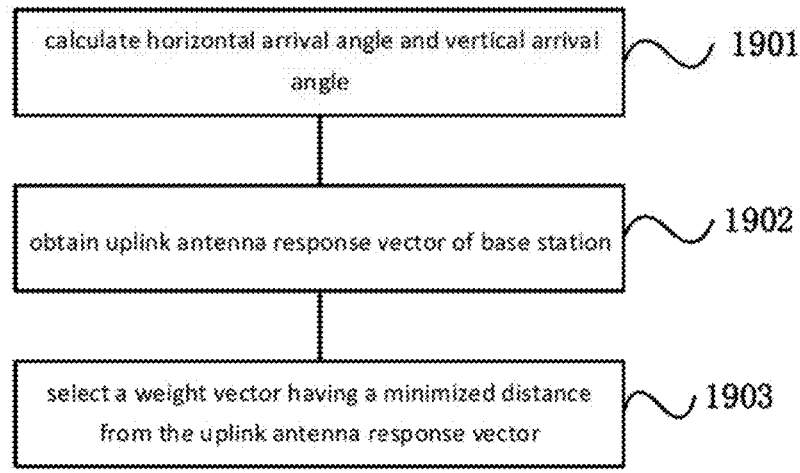
FIG. 19 shows a diagram of correcting an analog sub-codebook of a base station according to an embodiment of the present disclosure.

The specific steps of correcting the analog sub-codebook of the base station used for uplink beam training based on the result of downlink beam training are shown in FIG. 19. In step 1901, for each weight vector in the analog sub-codebook of the base station, a horizontal arrival angle and a vertical arrival angle that minimizes the distance between the weight vector and each base station terminal antenna response vector of the downlink channel are calculated. That is, for a weight vector $f_{in}$ in the analog sub-codebook of the base station, its corresponding horizontal arrival angle $\theta_{in}$ and a vertical arrival angle $\varphi_{in}$ are calculated, which satisfy the following conditions $$\{\theta_{in}, \varphi_{in}\} = \operatorname*{argmin}_{\theta,\varphi}\|f_{in} - a_{BS}^{DL}(\theta, \varphi)\|_2$$

Where $a_{BS}^{UL}(\theta,\varphi)$ is the base station terminal antenna response vector of the downlink channel.

In step 1902, according to the reciprocity between the antenna arrival angles of the uplink and downlink channels in the FDD system, a third antenna response vector of the base station terminal of the uplink channel corresponding to the horizontal arrival angle $\theta_{in}$ and the vertical arrival angle $\varphi_{in}$ calculated in step 1901 is obtained.

In step 1903, a weight vector having the smallest distance from the third antenna response vector is selected from the analog codebook of the base station as a corrected weight vector. That is to say, suppose the corrected weight vector is $f_{out}$, then $$f_{out} = \operatorname*{argmin}_{f \in F}\|f - a_{BS}^{UL}(\theta_{in}, \varphi_{in})\|_2$$

Where $a_{BS}^{UL}(\theta,\varphi)$ is the base station terminal antenna response vector of the uplink channel, and F is the analog codebook of the base station.

The above correction process is performed for each weight vector in the analog sub-codebook of the base station to finally obtain a corrected analog sub-codebook. The transmission configuration unit 703 will use the corrected analog sub-codebook to configure the base station, so that the base station uses the corrected analog sub-codebook in uplink beam training.

Figure 20:
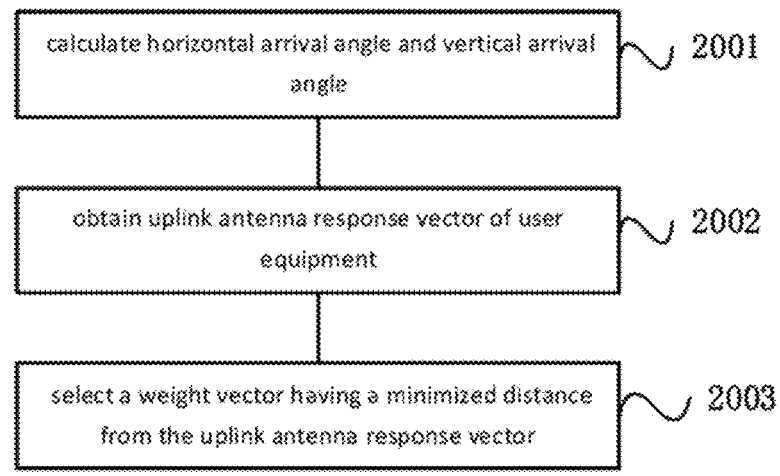
FIG. 20 shows a diagram of correcting an analog sub-codebook of a user equipment according to an embodiment of the present application.

The steps of correcting the analog sub-codebook of the user equipment for uplink beam training based on a result of downlink beam training is shown in FIG. 20. As shown in FIG. 20, in step 2001, for each weight vector in the analog sub-codebook of the user equipment, a horizontal arrival angle and a vertical arrival angle that minimizes the distance between the weight vector and each user equipment terminal antenna response vector of the downlink channel are calculated. For a weight vector $w_{in}$ in the analog sub-codebook of the user equipment, its corresponding horizontal arrival angle $\theta_{in}$ and vertical arrival angle $\varphi_{in}$ are calculated, which satisfy:

$$\{\theta_{in}, \varphi_{in}\} = \operatorname*{argmin}_{\theta,\varphi}\|w_{in} - a_{UE}^{DL}(\theta, \varphi)\|_2$$

Wherein $a_{BS}^{UL}(\theta,\varphi)$ is the user equipment terminal antenna response vector of the downlink channel.

In step 2002, by using the reciprocity between the antenna arrival angles of the uplink and downlink channels in the FDD system, a fourth antenna response vector of the user equipment terminal of the uplink channel corresponding to the horizontal arrival angle and the vertical arrival angle calculated in step 2001 is obtained.

In step 2003, a weight vector having the smallest distance from the fourth antenna response vector is selected from the analog codebook of the user equipment as a corrected weight vector. That is to say, suppose the corrected weight vector is $w_{out}$, then it satisfies:

$$w_{out} = \underset{w \in W}{\operatorname{argmin}} \|w - a_{UE}^{UL}(\theta_{in}, \varphi_{in})\|_2$$

Wherein $a_{BS}^{UL}(\theta,\varphi)$ is the user equipment terminal antenna response vector of the uplink channel, and W is the analog codebook of the user equipment.

In one embodiment according to the present application, the horizontal arrival angle θ and the vertical arrival angle φ may be discretized, e.g., they are limited to:

$$\theta \in \left\{0, \frac{1}{K_W}\pi, \ldots, \frac{(K_W-1)}{K_W}\pi\right\}$$

$$\varphi \in \left\{-\frac{1}{2}\pi, -\frac{1}{2}\pi + \frac{1}{K_H}\pi, \ldots, -\frac{1}{2}\pi + \frac{(K_H-1)}{K_H}\pi\right\}$$

That is, the horizontal arrival angle and the vertical arrival angle are sampled, with $K_W$ and $K_H$ representing the numbers of the sampling points respectively. In one embodiment, $K_W$=2 W and $K_H$=2H, wherein W is the number of antennas in the horizontal direction and H is number of antennas in the vertical direction.

When the analog sub-codebooks of the base station and the user equipment are obtained through uplink beam training and are prepared to be used in downlink beam training, the weight vectors of the base station and the user equipment should be selected from the corresponding analog sub-codebooks. Downlink beam training may use any training algorithm, but it is constrained to be performed in the analog sub-codebook. For example, if the exhaustive search algorithm is used in downlink beam training, $P_S \times Q_S$ weight vector pairs need to be detected, and the complexity is reduced from P×Q to $P_S \times Q_S$. If the single feedback algorithm is used in downlink beam training, the complexity is reduced from P+Q to $P_S + Q_S$.

In addition, taking the amount of data and user-specific requirements into consideration, the notifications about the analog sub-codebooks which are referred to in the present invention may be carried by the following signaling in, for example, an LTE system: for example, the dedicated signaling carried by the downlink shared channel DL-SCH or the uplink shared channel UL-SCH of the MAC layer or the RRC (Radio Resource Control) layer and the like, wherein the MAC layer signaling is more time efficient than the RRC layer signaling, and has a faster decoding rate; the RRC layer signaling is easier to implement than the MAC layer signaling. Specifically, in an example of using the MAC layer dedicated signaling to carry notifications about an analog sub-codebook, it is specifically indicated by bits included in a specific MAC control element in one or more MAC protocol data units (PDUs) (for example, which are coded to indicate the index of each weight vector), and a special LCID can be set for the MAC control element to identify its notifications for an analog sub-codebook. In an example of using RRC layer dedicated signaling to carry notifications about an analog sub-codebook, indexes of weight vectors included in the analog sub-codebook are indicated by information in a radio resource control information unit specifically, for example. The notification about an analog sub-codebook involves step 805 in FIG. 8, step 903 in FIG. 9, step 1003 in FIG. 10, step 1203 in FIG. 12, and step 1303 in FIG. 13, for example.

To further illustrate the present invention, a more specific embodiment is to given below.

Consider a single-cell multi-user millimeter-wave large-scale antenna system working in FDD mode, a base station uses a hybrid precoding architecture and serves K users at the same time, with K RF links provided on the base station terminal and zero-forcing (ZF) precoding used in its digital portion. Both of the base station and the user equipment terminals are equipped with a ULA antenna array, with numbers of antennas of M and N respectively, and both of them use the design scheme of the classical DFT beamforming codebook. The codebook is determined by the following codebook matrix $$[C]_{i,m} = j^{\left\lfloor \frac{i \times ((m+N_c/2) \bmod N_c)}{N_c/4} \right\rfloor}, 1 \leq i \leq N_a, 1 \leq m \leq N_c$$

Here, $N_a$ represents the number of antennas and $N_c$ represents the size of the codebook. Specific system simulation parameters are shown in the following table:

TABLE 1

| specific simulation parameters | |
|---|---|
| the number M of antennas of base station | 64 |
| the number N of antennas of user equipment terminal | 8 |
| the number K of users in the cell | 4 |
| the size P of codebook for beamforming in base station terminal | 128 |
| the size Q of codebook for beamforming in user equipment terminal | 16 |
| channel parameters $\{N_{cl}, N_{ray}\}$ | {1,3}, {3,8} |
| standard deviation of channel angle spread | 8° |
| uplink channel wavelength $\lambda_{UL}$ | 2d |
| downlink channel wavelength $\lambda_{DL}$ | $\frac{10}{9}\lambda_{UL}$ |

Suppose the OFDM parameters specified in LTE are used for transmission, with one time slot being 0.5 ms which includes 7 OFDM symbols. Due to the restriction of physical conditions, a phase shifter cannot be switched within one OFDM symbol period, thus each OFDM symbol can be used to detect one combination of weight vectors. In addition, it is assumed that the period of beam searching is 0.5 s. It can be calculated that each period of beam searching contains B=7000 OFDM symbols.

Considering the traditional exhaustive search mechanism, the overhead of beam training is PQ OFDM symbols. However, the reduced codebook based beam training mechanism proposed herein can reduce the training overhead to PsQs OFDM symbols.

In order to verify the performance of the reduced codebook based training mechanism proposed herein, a simulation of the average achievable rate of users is given below, wherein a total of four schemes are considered: (1) $P_s$=12, $Q_s$=2, with weight vector correction; (2) $P_s$=12, $Q_s$=2, without weight vector correction; (3) $P_s$=8, $Q_s$=1, with weight vector correction; (4) $P_s$=8, $Q_s$=1, without weight vector correction.

The following table shows a training overhead comparison between the conventional scheme and the scheme proposed in the present invention, expressed as a percentage:

| scheme | training overhead |
| --- | --- |
| traditional scheme | 29.26% |
| reduced codebook scheme, $P_s = 12, Q_s = 2$ | 0.34% |
| reduced codebook scheme, $P_s = 8, Q_s = 1$ | 0.11% |

As can be seen from the above table, the beam training method of the present application can greatly reduce the overhead of downlink (uplink) beam training.

Figure 21:
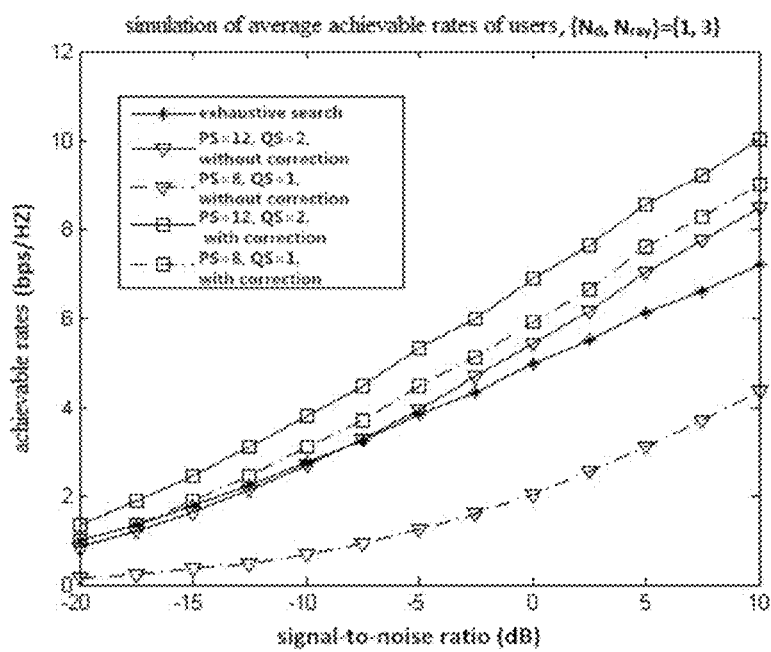
FIG. 21 shows a profile of average achievable rate of users versus signal-to-noise ratio according to an embodiment of the present disclosure.

In consideration of the training overhead, FIG. 21 shows the average achievable rate of users of several schemes when the channel conditions are $N_{cl}=1$ and $N_{ray}=3$. It can be seen that since the analog sub-codebook based beam training scheme can greatly reduce the beam training overhead, the average achievable rate of users is increased compared to the conventional scheme, showing that the beam training method proposed in this application can improve the performance of the FDD system. In addition, it can be noted that, under the condition of the same analog sub-codebook size, the scheme with correction has a significant performance gain compared to the scheme without correction, and therefore a correction step is included in the preferred embodiment of generating an analog sub-codebook.

Figure 22:
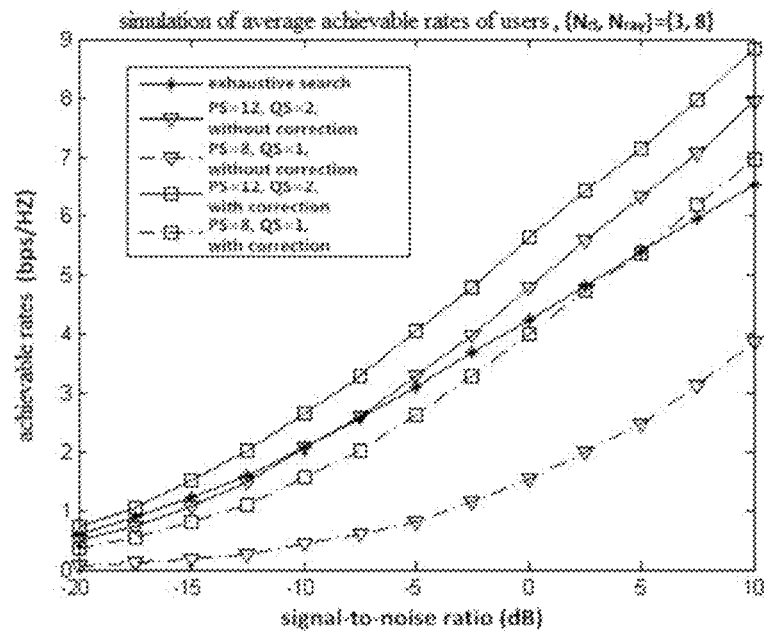
FIG. 22 shows a profile of average achievable rate of users versus signal-to-noise ratio according to an embodiment of the present disclosure.

FIG. 22 shows the average achievable rate of users of several schemes when the channel conditions are $N_{cl}=3$ and $N_{ray}=8$, from which a similar conclusion can be obtained. Meanwhile, it should also be noticed that, compared to the situation with channel conditions of $N_{cl}=1$, $N_{ray}=3$, the performance gain is slightly degraded, especially when $P_s=8$ and $Q_s=1$, thus when there are many channel scatterers, the size of the analog sub-codebook may be appropriately increased to guarantee the performance. In other words, the size of the analog sub-codebook may optionally be changed dynamically, for example, dynamically adjusted according to a current application scenario or a change in the performance of a monitored system. The adjustment may be performed by a network-side device, for example set by a base station according to a program, or configured by an operator, and notified to a peer communication device such as a user equipment through broadcast or dedicated control signaling, so that the peer communication device may select a corresponding number of configuration parameters as an analog sub-codebook.

Application Example

The technology of the present disclosure can be applied to various products. For example, the base station may be implemented as any type of evolved Node B (eNB), such as a macro eNB and a small eNB. A small eNB may be an eNB that covers cells smaller than the macro cells, such as a pico eNB, a micro eNB, or a home (femto) eNB. Instead, the base station may be implemented as any other type of base station, such as a NodeB and a Base Transceiver Station (BTS). The base station may comprise: a main body configured to control wireless communication (also referred to as a base station device, such as the electronic devices 700 and 710 described in this application); and one or more remote radio heads (RRHs) that are located in different locations from the main body. In addition, various types of terminals described below may operate as a base station by temporarily or semi-permanently performing the functions of a base station.

For example, the terminal device may be implemented as a mobile terminal such as a smart phone, a tablet personal computer (PC), a notebook PC, a portable game terminal, a portable/dongle type mobile router and a digital camera; or an on-board terminal such as a car navigation device. The terminal device may also be implemented as a terminal performing machine-to-machine (M2M) communication (also referred to as a machine type communication (MTC) terminal). In addition, the terminal device may be a wireless communication module (such as an integrated circuit module including a single wafer, for example, the electronic devices 700 and 710 described in the present application) installed on each of the aforementioned terminals.

Figure 23:
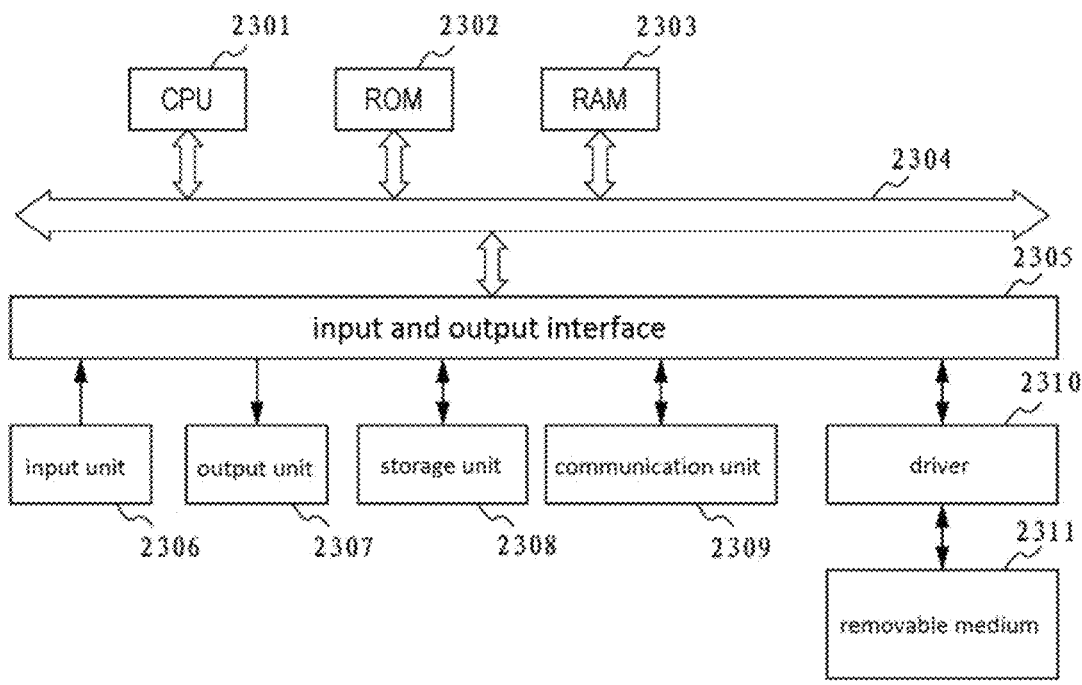
FIG. 23 shows an example of a hardware configuration of the electronic device according to the present disclosure.

FIG. 23 shows an example of a hardware configuration of the electronic device according to the present invention.

The central processing unit (CPU) 2301 functions as a data processing unit that executes various types of processing based on programs stored on read only memory (ROM) 2302 or a storage unit 2308. For example, the CPU 2301 executes processing based on the aforementioned sequence. The random access memory (RAM) 2303 stores programs, data and the like executed by the CPU 2301. The CPU 2301, the ROM 2302, and the RAM 2303 are connected to one another via a bus 2304.

The CPU 2301 is connected to the input and output interface 2305 via bus 2304, and an input unit 2306 composed of various types of switches, a keyboard, a mouse, a microphone and the like and an output unit 2307 composed of a display, a speaker and the like are connected to the input and output interface 2305. For example, the CPU 2301 executes various types of processing in response to instructions inputted from the input unit 2306, and outputs the processing results to the output unit 2307.

The storage unit 2308 connected to the input and output interface 2305 is constituted by a hard disk, for example, and stores programs executed by the CPU 2301 and various kinds of data thereon. The communication unit 2309 communicates with external devices via a network such as the Internet or a local area network.

The driver 2310 connected to the input and output interface 2305 drives a removable medium 2311 such as a magnetic disk, an optical disk, a magneto-optical disk, or semiconductor memory (for example, a memory card) and the like, and acquires various types of data such as content and key information recorded thereon. For example, by using the acquired content and key data, processings such as beam training for wireless communication and the like are performed by the CPU 2301 based on a reproduction program.

The method and system of the present invention may be implemented in many ways. For example, the method and system of the present invention may be implemented by software, hardware, firmware, or any combination of software, hardware and firmware. The above sequence of steps of the method is merely for the purpose of illustration, and the steps of the method of the present invention are not limited to the above-described specific order unless otherwise specified. In addition, in some embodiments, the present invention may also be implemented as programs recorded in a recording medium, wherein these programs include machine-readable instructions for implementing the method according to the present invention. Thus, the present invention also covers a recording medium storing programs for executing the method according to the present invention.

Finally, the present application may be implemented in the following ways.

(1) An electronic device for a first communication device in a wireless communication system, the electronic device comprising:

storage device configured to store an analog codebook for the first communication device, the analog codebook comprising a plurality of sets of configuration parameters for a set of phase shifters of the first communication device; and a processing circuit configured to:

performing channel estimation on a first channel from a second communication device to the first communication device respectively based on the plurality of sets of configuration parameters and pilot signal transmission from the second communication device, selecting a set of configuration parameters corresponding to ones of the channel estimation results that satisfy a predetermined condition to generate a reduced analog sub-codebook, configuring a pilot signal transmission from the first communication device to the second communication device based on the analog sub-codebook, to be used in channel estimation on a second channel from the first communication device to the second communication device.

(2). The electronic device according to (1), wherein each set of the plurality of sets of configuration parameters corresponds to a weight vector, and each weight vector is used to configure a phase value for each phase shifter in the set of phase shifters.

(3). The electronic device according to (1), wherein the processing circuit is further configured to correct the reduced analog sub-codebook based on a signal transmission frequency between the first communication device and the second communication device to obtain a corrected analog sub-codebook, and configure the pilot signal transmission from the first communication device to the second communication device by using the corrected analog sub-codebook.

(4). The electronic device according to (1), wherein the storage device is further configured to store a peer analog codebook for the second communication device, the peer analog codebook comprising a plurality of sets of configuration parameters for a set of phase shifters of the second communication device;

the processing circuit is further configured to (a peer sub-codebook generation unit) select a set of configuration parameters of the second communication device corresponding to ones of the channel estimation results that satisfy a predetermined condition to generate a reduced peer analog sub-codebook for the second communication device, wherein the second communication device configures reception of pilot signal from the first communication device to the second communication device based on the peer analog sub-codebook.

(5). The electronic device according to (4), wherein the processing circuit is further configured to correct the reduced peer analog sub-codebook based on a signal transmission frequency between the first communication device and the second communication device and an antenna configuration of the second communication device to obtain a corrected peer analog sub-codebook, wherein the corrected peer analog sub-codebook is used by the second communication device to configure reception of pilot signal from the first communication device to the second communication device.

(6). The electronic device according to (4), wherein the processing circuit is further configured to, before configuring the pilot signal transmission from the first communication device to the second communication device, generate a message about the peer analog sub-codebook to inform the second communication device.

(7). The electronic device according to any one of (1) to (6), wherein the processing circuit is further configured to determine one set of the plurality of sets of configuration parameters for configuring data signal transmission through the second channel based on feedback of channel estimation of the second channel provided by the second communication device, wherein the feedback of channel estimation includes a channel estimation result corresponding to a set of configuration parameters having an optimal channel performance.

(8). The electronic device according to (7), wherein the electronic device operates as the first communication device, and further comprises the set of phase shifters, a radio frequency link, and a plurality of antennas, wherein the set of phase shifters are disposed between the radio frequency link and the plurality of antennas, wherein the processing circuit configures phases of the set of the phase shifters based on the analog sub-codebook, and uses the plurality of antennas to transmit pilot signal to the second communication device.

(9). The electronic device according to (8), wherein the first communication device is a base station, the second communication device is a user equipment, the first channel corresponds to an uplink channel, and the second channel corresponds to a downlink channel.

(10). The electronic device according to (8), wherein the first communication device is a user equipment, the second communication device is a base station, the first channel corresponds to a downlink channel, and the second channel corresponds to an uplink channel.

(11). The electronic device according to (9), wherein the processing circuit is further configured to, before performing the channel estimation of the first channel from the second communication device to the first communication device, generate a control message for configuring pilot signal transmission of the second communication device, the control message including control parameters of the pilot signal transmission.

(12) The electronic device according to (9), wherein the electronic device comprises a plurality of radio frequency links, each of the radio frequency links is coupled to a set of phase shifters, and the electronic device further comprises a digital precoder coupled to the plurality of radio frequency links; the processing circuit is further configured to generate a digital precoding matrix based on feedback of channel estimation from a plurality of the second communication devices, to enable the digital precoder to perform digital precoding of data signals for the plurality of second communication devices.

(13) The electronic device according to (1), wherein the wireless communication system is a frequency division duplex communication system.

(14) An electronic device for a second communication device in a wireless communication system, comprising:

storage device configured to store an analog codebook for the second communication device, the analog codebook comprising a plurality of sets of configuration parameters for a set of phase shifters of the second communication device; and a processing circuit configured to:

configuring pilot signal transmission from the second communication device to a first communication device based on the plurality of sets of configuration parameters, to be used in channel estimation of a first channel from the second communication device to the first communication device, obtaining, from the first communication device, a reduced analog sub-codebook for the second communication device, the analog sub-codebook being generated by the first communication device based on a set of configuration parameters corresponding to ones of channel estimation results on the first channel that satisfy a predetermined condition, configuring reception of pilot signal from the first communication device based on the analog sub-codebook, and performing channel estimation of a second channel from the first communication device to the second communication device.

(15). A beam training method for frequency division duplex (FDD) millimeter wave communication, comprising:

sending, by a user equipment, an uplink training sequence to a base station according to a user terminal codebook;

receiving, by the base station, the uplink training sequence and calculating channel qualities under multiple combinations between weight vectors in the user terminal codebook and weight vectors in a base station terminal codebook;

selecting a corresponding channel quality for each weight vector in the base station terminal codebook according to the channel qualities to form a first channel quality set;

selecting a corresponding channel quality for each weight vector in the user terminal codebook according to the channel qualities to form a second channel quality set;

selecting a first predetermined number of channel qualities from the first channel quality set and generating a reduced base station terminal codebook based on the weight vectors corresponding to the first predetermined number of channel qualities;

selecting a second predetermined number of channel qualities from the second channel quality set and generating a reduced user equipment terminal codebook based on the weight vectors corresponding to the second predetermined number of channel qualities; and performing downlink beam training using the reduced base station terminal codebook and the reduced user equipment terminal codebook.

(16). The beam training method according to (15), wherein the multiple combinations between the weight vectors in the user terminal codebook and the weight vectors in the base station terminal codebook comprise:

all combinations between the weight vectors in the user terminal codebook and the weight vectors in the base station terminal codebook.

(17). The beam training method according to (15), wherein the multiple combinations between the weight vectors in the user terminal codebook and the weight vectors in the base station terminal codebook comprise:

at least a portion of all the combinations between the weight vectors in the user terminal codebook and the weight vectors in the base station terminal codebook.

(18). The beam training method according to (17), wherein the multiple combinations between the weight vectors in the user terminal codebook and the weight vectors in the base station terminal codebook comprise: combinations between one of the weight vectors in the base station terminal codebook and all the weight vectors in the user terminal codebook, and combinations between one of the weight vectors in the user terminal codebook and all the weight vectors in the base station terminal codebook.

(19). The beam training method according to (18), wherein according to channel qualities obtained from combinations between one of the weight vectors in the base station terminal codebook and all the weight vectors in the user terminal codebook, weight vectors to be combined with all the weight vectors in the base station terminal codebook are selected from the weight vectors in the user terminal codebook.

(20). The beam training method according to (15), wherein in the step of selecting a corresponding channel quality for each weight vector in the base station terminal codebook according to the channel qualities to form a first channel quality set, an optimal channel quality is selected for each weight vectors in the base station terminal codebook.

(21). The beam training method according to (15), wherein in the step of selecting a corresponding channel quality for each weight vector in the user terminal codebook according to the channel qualities to form a second channel quality set, an optimal channel quality is selected for each weight vectors in the user terminal codebook.

(22). The beam training method according to (15), further comprising: before performing downlink beam training, sending the reduced user equipment terminal codebook to the user equipment.

(23). The beam training method according to (15), further comprising: sending antenna parameters from the user equipment to the base station.

(24). The beam training method according to (23), wherein the antenna parameters comprise an antenna type and/or antenna spacing.

(25). The beam training method according to (23), wherein the base station calculates antenna response vectors of the user equipment based on the antenna parameters.

(26). The beam training method according to (15), further comprising: correcting the reduced base station terminal codebook.

(27). The beam training method according to (26), wherein the step of correcting the reduced base station terminal codebook comprises:

for each weight vector in the reduced base station terminal codebook, calculating a horizontal arrival angle and a vertical arrival angle that minimize a distance between the weight vector and each base station terminal antenna response vector of an uplink channel;

obtaining a first antenna response vector of the base station terminal of a downlink channel corresponding to the calculated horizontal arrival angle and vertical arrival angle;

selecting, from the base station terminal codebook, a weight vector having the smallest distance from the first antenna response vector as a corrected weight vector.

(28). The beam training method according to (15), further comprising: correcting the reduced user terminal codebook.

(29). The beam training method according to (28), wherein the step of correcting the reduced user terminal codebook comprises:

for each weight vector in the reduced user terminal codebook, calculating a horizontal arrival angle and a vertical arrival angle that minimize a distance between the weight vector and each user equipment terminal antenna response vector of an uplink channel;

obtaining a second antenna response vector of the user equipment terminal of a downlink channel corresponding to the calculated horizontal arrival angle and vertical arrival angle;

selecting, from the user equipment terminal codebook, a weight vector having the smallest distance from the second antenna response vector as a corrected weight vector.

(30). The beam training method according to (27) or (29), wherein the horizontal arrival angle and the vertical arrival angle are discretized through sampling.

(31). The beam training method according to (30), wherein the number of sampling points of the horizontal arrival angle is equal to an integer multiple of the number of corresponding antennas in the horizontal direction, and the number of sampling points of the vertical arrival angle is equal to an integer multiple of the number of corresponding antennas in the vertical direction.

(32). A base station for frequency division duplex (FDD) millimeter wave communication, comprising a processor, the processor configured to: receiving an uplink training sequence sent by a user equipment according to a user terminal codebook;

calculating channel qualities under multiple combinations between weight vectors in the user terminal codebook and weight vectors in a base station terminal codebook;

selecting a corresponding channel quality for each weight vector in the base station terminal codebook according to the channel qualities to form a first channel quality set;

selecting a corresponding channel quality for each weight vector in the user terminal codebook according to the channel qualities to form a second channel quality set;

selecting a first predetermined number of channel qualities from the first channel quality set and generating a reduced base station terminal codebook based on the weight vectors corresponding to the first predetermined number of channel qualities;

selecting a second predetermined number of channel qualities from the second channel quality set and generating a reduced user equipment terminal codebook based on the weight vectors corresponding to the second predetermined number of channel qualities; and performing downlink beam training using the reduced base station terminal codebook and the reduced user equipment terminal codebook.

(33). A base station for Frequency Division Duplex (FDD) millimeter wave communication, comprising:

a receiving unit for receiving an uplink training sequence sent by a user equipment according to a user terminal codebook;

a calculation unit for calculating channel qualities under multiple combinations between weight vectors in the user terminal codebook and weight vectors in a base station terminal codebook;

a first set generation unit for selecting a corresponding channel quality for each weight vector in the base station terminal codebook according to the channel qualities to form a first channel quality set;

a second set generation unit for selecting a corresponding channel quality for each weight vector in the user terminal codebook according to the channel qualities to form a second channel quality set;

a first selecting unit for selecting a first predetermined number of channel qualities from the first channel quality set;

a second selecting unit for selecting a second predetermined number of channel qualities from the second channel quality set;

a first codebook generation unit for generating a reduced base station terminal codebook based on weight vectors corresponding to the first predetermined number of channel qualities;

a second codebook generation unit for generating a reduced user equipment terminal codebook based on weight vectors corresponding to the second predetermined number of channel qualities; and performing downlink beam training using the reduced base station terminal codebook and the reduced user equipment terminal codebook.

(34). A beam training method for frequency division duplex (FDD) millimeter wave communication, comprising:

sending, by a base station, a downlink training sequence to a user equipment according to a base station terminal codebook;

receiving, by the user equipment, the downlink training sequence and calculating channel qualities under multiple combinations between weight vectors in a user terminal codebook and weight vectors in the base station terminal codebook;

selecting a corresponding channel quality for each weight vector in the base station terminal codebook according to the channel qualities to form a first channel quality set;

selecting a corresponding channel quality for each weight vector in the user terminal codebook according to the channel qualities to form a second channel quality set;

selecting a first predetermined number of channel qualities from the first channel quality set and generating a reduced base station terminal codebook based on the weight vectors corresponding to the first predetermined number of channel qualities;

selecting a second predetermined number of channel qualities from the second channel quality set and generating a reduced user equipment terminal codebook based on the weight vectors corresponding to the second predetermined number of channel qualities; and performing uplink beam training using the reduced base station terminal codebook and the reduced user equipment terminal codebook.

(35). The beam training method according to (34), further comprising: correcting the reduced base station terminal codebook.

(36). The beam training method according to (35), wherein the step of correcting the reduced base station terminal codebook comprises:

for each weight vector in the reduced base station terminal codebook, calculating a horizontal arrival angle and a vertical arrival angle that minimize a distance between the weight vector and each base station terminal antenna response vector of a downlink channel;

obtaining a third antenna response vector of the base station terminal of an uplink channel corresponding to the calculated horizontal arrival angle and vertical arrival angle;

selecting, from the base station terminal codebook, a weight vector having the smallest distance from the third antenna response vector as a corrected weight vector.

(37). The beam training method according to (34), further comprising: correcting the reduced user terminal codebook.

(38). The beam training method according to (34), wherein the step of correcting the reduced user terminal codebook comprises:

for each weight vector in the reduced user terminal codebook, calculating a horizontal arrival angle and a vertical arrival angle that minimize a distance between the weight vector and each user equipment terminal antenna response vector of a downlink channel;

obtaining a fourth antenna response vector of the user equipment terminal of an uplink channel corresponding to the calculated horizontal arrival angle and vertical arrival angle;

selecting, from the user equipment terminal analog codebook, a weight vector having the smallest distance from the fourth antenna response vector as a corrected weight vector.

(39). A user equipment for frequency division duplex (FDD) millimeter wave communication, comprising a processor, wherein the processor is configured to:

receiving a downlink training sequence sent by a base station according to a base station terminal codebook;

calculating channel qualities under multiple combinations between weight vectors in a user terminal codebook and weight vectors in the base station terminal codebook;

selecting a corresponding channel quality for each weight vector in the base station terminal codebook according to the channel qualities to form a first channel quality set;

selecting a corresponding channel quality for each weight vector in the user terminal codebook according to the channel qualities to form a second channel quality set;

selecting a first predetermined number of channel qualities from the first channel quality set and generating a reduced base station terminal codebook based on the weight vectors corresponding to the first predetermined number of channel qualities;

selecting a second predetermined number of channel qualities from the second channel quality set and generating a reduced user equipment terminal codebook based on the weight vectors corresponding to the second predetermined number of channel qualities; and performing uplink beam training using the reduced base station terminal codebook and the reduced user equipment terminal codebook.

(40). A user equipment for frequency division duplex (FDD) millimeter wave communication, comprising:

a receiving unit for receiving a downlink training sequence sent by a base station according to a base station terminal codebook;

a calculation unit for calculating channel qualities under multiple combinations between weight vectors in the user terminal codebook and weight vectors in a base station terminal codebook;

a first set generation unit for selecting a corresponding channel quality for each weight vector in the base station terminal codebook according to the channel qualities to form a first channel quality set;

a second set generation unit for selecting a corresponding channel quality for each weight vector in the user terminal codebook according to the channel qualities to form a second channel quality set;

a first selecting unit for selecting a first predetermined number of channel qualities from the first channel quality set;

a second selecting unit for selecting a second predetermined number of channel qualities from the second channel quality set;

a first codebook generation unit for generating a reduced base station terminal codebook based on weight vectors corresponding to the first predetermined number of channel qualities;

a second codebook generation unit for generating a reduced user equipment terminal codebook based on weight vectors corresponding to the second predetermined number of channel qualities; and performing uplink beam training using the reduced base station terminal codebook and the reduced user equipment terminal codebook.

(41). A communication system, comprising a user equipment and a base station according to (32) or (33).

(42). A communication system, comprising a base station and a user equipment according to (39) or (40).

(43). A beam training method for frequency division duplex (FDD) millimeter wave communication, comprising:

sending, by a second communication device, a training sequence to a first communication device according to a second device terminal codebook;

receiving, by the first communication device, the training sequence and calculating channel qualities under multiple combinations between weight vectors in a first communication device terminal codebook and weight vectors in the second communication device terminal codebook;

selecting a corresponding channel quality for each weight vector in the first communication device terminal codebook according to the channel qualities to form a first channel quality set;

selecting a corresponding channel quality for each weight vector in the second communication device terminal codebook according to the channel qualities to form a second channel quality set;

selecting a first predetermined number of channel qualities from the first channel quality set and generating a reduced first communication device terminal codebook based on the weight vectors corresponding to the first predetermined number of channel qualities;

selecting a second predetermined number of channel qualities from the second channel quality set and generating a reduced second communication device terminal codebook based on the weight vectors corresponding to the second predetermined number of channel qualities; and performing beam training for sending information from the first communication device to the second communication device by using the reduced first communication device terminal codebook and the reduced second communication device terminal codebook.

(44). A beam training method for frequency division duplex (FDD) millimeter wave communication, comprising:

sending, by a second communication device, a training sequence to a first communication device according to a second device terminal codebook;

receiving, by the first communication device, the training sequence and calculating channel qualities under multiple combinations between weight vectors in a first communication device terminal codebook and weight vectors in the second communication device terminal codebook;

selecting a corresponding channel quality for each weight vector in the first communication device terminal codebook according to the channel qualities to form a first channel quality set;

selecting a corresponding channel quality for each weight vector in the second communication device terminal codebook according to the channel qualities to form a second channel quality set;

selecting a first predetermined number of channel qualities from the first channel quality set and generating a reduced first communication device terminal codebook based on the weight vectors corresponding to the first predetermined number of channel qualities;

selecting a second predetermined number of channel qualities from the second channel quality set and generating a reduced second communication device terminal codebook based on the weight vectors corresponding to the second predetermined number of channel qualities; and performing beam training for sending information from the first communication device to the second communication device by using the reduced first communication device terminal codebook and the reduced second communication device terminal codebook.

(45). The method according to (44), further comprising:

selecting a corresponding channel quality for each weight vector in the second communication device terminal codebook according to the channel qualities to form a second channel quality set;

selecting a second predetermined number of channel qualities from the second channel quality set and generating a reduced second communication device terminal codebook based on the weight vectors corresponding to the second predetermined number of channel qualities; and performing beam training for sending information from the first communication device to the second communication device by using the reduced first communication device terminal codebook and the reduced second communication device terminal codebook.

(46). A beam management method used in a frequency division duplex (FDD) communication system, comprising:

performing beam measurement on a set of transmission beams from a subject communication node based on a set of reception beams;

based on beam measurement results, performing selection on reception beams to determine a subset of the set of reception beams; and transmitting backward beams to the subject communication node for backward beam measurement based on beam directions corresponding to the subset of the set of reception beams.

(47). The method according to (46), further comprising: based on beam measurement results, performing selection on transmission beams to determine a subset of the set of transmission beams, and indicating information of the subset of the set of transmission beams to the subject communication node, so that the subject communication node receives the backward beams based on beam directions corresponding to the subset of the set of transmission beams.

(48) The method according to (46), wherein a number of the backward beams is equal to a number of reception beams included in the subset of the set of reception beams.

(49) An electronic device, comprising a processing circuit configured to perform the method of any one of (46) to (48).

Hereto, the beam training method and the electronic device used for the base station and the user equipment according to the present invention have been described in detail. In order to avoid obscuring the concepts of the present invention, some details known in the art are not described. Based on the above description, those skilled in the art can understand how to implement the technical solutions disclosed herein.

The method and system of the present invention may be implemented in many ways. For example, the method and system of the present invention may be implemented by software, hardware, firmware, or any combination of software, hardware, and firmware. The above sequence of steps of the method is merely for illustration, and the steps of the method of the present invention are not limited to the above order which is described specifically unless otherwise specified. In addition, in some embodiments, the present invention may also be implemented as programs recorded in a recording medium, which include machine-readable instructions for implementing the method according to the present invention. Thus, the present invention also covers a recording medium storing programs for executing the method according to the present invention.

Although some specific embodiments of the present invention have been described in detail by way of example, those skilled in the art should understand that the above examples are only for the purpose of illustration and are not intended to limit the scope of the present invention. It should be understood by those skilled in the art that the above embodiments may be modified without departing from the scope and spirit of the present invention. The scope of the present invention is defined by the following claims.

What is claimed is:

1. An electronic device for a user equipment in a wireless communication system, comprising:
   a processing circuit configured to:
   receive, from a base station, channel state information reference signal with a set of reception filters;
   perform channel estimation on a downlink channel from the base station to the user equipment;
   select, from the set of reception filters, one or more particular reception filters corresponding to respective channel estimation results that satisfy a first predetermined condition; and
   signal, from the user equipment to the base station, sounding reference signal with one or more particular transmission filters, wherein the one or more particular transmission filters and one or more particular reception filters are reciprocal respectively.

2. The electronic device according to claim 1, wherein the processing circuit is further configured to receive, from the base station, configuration information indicating the reciprocal relationship between the one or more particular transmission filters and one or more particular reception filters.

3. The electronic device according to claim 1, wherein the set of reception filters indicate antenna arrival angles.

4. The electronic device according to claim 1, wherein the one or more particular reception filters include a downlink channel matrix that is reciprocal to an uplink channel matrix of the one or more particular transmission filters.

5. The electronic device according to claim 1, wherein the set of reception filters corresponds to a weight vector, and each weight vector is used to configure phase values for phase shifters of a set of phase shifters connected to a radio frequency link, and is used to transmit antenna beams in specific spatial directions.

6. The electronic device according to claim 1, wherein the processing circuit is further configured to:
   generate an exhaustive search by detecting all possible combinations between weight vectors of the user equipment and weight vectors of the base station;
   measure channel quality between the weight vectors of all possible combinations;
   select from the measured channel qualities, as the first predetermined condition an optimal set of weight vectors to be determined to be the set of reception filters.

7. The electronic device according to claim 1,
   wherein the wireless communication system is a frequency division duplex system;
   wherein the one or more particular transmission filters and one or more particular reception filters are reciprocal respectively based on reciprocity of arrival angles in uplink and downlink channels in the frequency division duplex system; and
   the processing circuit is further configured to:
   obtain information from beam training in the uplink channel to facilitate beam training in the downlink channel.

8. The electronic device according to claim 1, further comprising:
   storage circuitry configured to store an analog codebook for the base station, the analog codebook comprising a plurality of sets of second configuration parameters for a set of phase shifters of the base station;
   channel estimation circuitry configured to estimate channel quality of an uplink based on the stored analog codebook and the sounding reference signal.

9. An electronic device for a base station in a wireless communication system, comprising:

a processing circuit configured to:
receive, from a user equipment, sounding reference signal with a set of reception filters;
perform channel estimation on an uplink channel from the user equipment to the base station;
select, from the set of reception filters, one or more particular reception filters; and
transmit to the user equipment with one or more particular transmission filters, wherein the one or more particular transmission filters and one or more particular reception filters are reciprocal respectively.

10. The electronic device according to claim 9, wherein the processing circuit is further configured to send, to the user equipment, a notification of the reciprocal relationship between the one or more particular transmission filters and one or more particular reception filters.

11. The electronic device according to claim 9, further comprising:
a storage device configured to store an analog codebook for the user equipment, the analog codebook comprising a plurality of sets of second configuration parameters for a set of phase shifters of the user equipment.

12. The electronic device according to claim 9, wherein the processing circuit is further configured to:
receive, from the user equipment, an optimal set of weight vectors determined to be the set of reception filters.

13. The electronic device according to claim 12, wherein the processing circuit is further configured to:
transmit, to the user equipment, a pilot signal for each of the weight vectors of the base station to estimate each of the measured channel qualities.

14. The electronic device according to claim 13, wherein the processing circuit is further configured to:
receive, from the user equipment, an index of the optimal set of weight vectors.

15. The electronic device according to claim 9, further comprising
a hybrid precoding architecture including:
a digital precoder configured to obtain a plurality of data streams as input and to perform digital precoding on each of the plurality of data streams and to process the plurality of data streams by forming respective radio frequency links each corresponding to a plurality of terminals of a type as the user equipment; and
an analog phase-shifting network connecting to the radio frequency links.

16. The electronic device according to claim 9, further comprising
a hybrid precoding architecture including:
a digital precoder configured to obtain a plurality of data streams as input and to perform digital precoding on each of the plurality of data streams and to process the plurality of data streams by forming respective radio frequency links each corresponding to a plurality of terminals of a type as the user equipment; and
an analog phase-shifting network connecting to the radio frequency links;
wherein the analog phase-shifting network is a full connection phase-shifting network.

17. The electronic device according to claim 9, further comprising
a hybrid precoding architecture including:
a digital precoder configured to obtain a plurality of data streams as input and to perform digital precoding on each of the plurality of data streams and to process the plurality of data streams by forming respective radio frequency links each corresponding to a plurality of terminals of a type as the user equipment; and
an analog phase-shifting network connecting to the radio frequency links;
wherein the analog phase-shifting network is a sub-connection phase-shifting network.

* * * * *